(12) United States Patent
Batz et al.

(10) Patent No.: US 10,793,189 B2
(45) Date of Patent: Oct. 6, 2020

(54) KING-PIN JOINT ASSEMBLY

(71) Applicant: Dana Heavy Vehicle Systems Group, LLC, Maumee, OH (US)

(72) Inventors: Christopher P. Batz, Springfield, MO (US); Thomas R. Bosler, Whitehouse, OH (US); Steven G. Slesinski, Ann Arbor, MI (US); Stoyan I. Stoychev, Sylvania, OH (US); Harry W. Trost, Royal Oak, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 185 days.

(21) Appl. No.: 15/898,779

(22) Filed: Feb. 19, 2018

(65) Prior Publication Data

US 2019/0256134 A1 Aug. 22, 2019

(51) Int. Cl.
*B62D 7/18* (2006.01)
*B60K 17/30* (2006.01)
*B60B 35/00* (2006.01)
*B62D 7/16* (2006.01)

(52) U.S. Cl.
CPC .............. *B62D 7/18* (2013.01); *B60B 35/003* (2013.01); *B60K 17/306* (2013.01); *B62D 7/16* (2013.01)

(58) Field of Classification Search
CPC .......... B62D 7/18; B62D 7/16; B60B 35/003; B60K 17/306
See application file for complete search history.

(56) References Cited

U.S. PATENT DOCUMENTS

| | | | | |
|---|---|---|---|---|
| 1,446,431 A * | 2/1923 | Parnacott | ................ | B62D 7/18 280/124.126 |
| 1,471,575 A * | 10/1923 | Simons | .................... | B62D 7/18 280/93.512 |
| 1,795,428 A * | 3/1931 | Gurney | .................... | B62D 7/18 280/93.512 |
| 1,946,738 A * | 2/1934 | Gulan, Sr. | ................ | B62D 7/18 280/93.512 |
| 2,133,536 A * | 10/1938 | Canfield | .............. | B60K 17/303 180/262 |
| 2,208,189 A * | 7/1940 | Jones | ...................... | B62D 7/18 280/93.512 |
| 3,369,848 A * | 2/1968 | Gerner | .................... | B62D 7/16 384/218 |
| 3,441,288 A * | 4/1969 | Boughner | ................ | B62D 7/18 280/93.512 |

(Continued)

*Primary Examiner* — Timothy Wilhelm
(74) *Attorney, Agent, or Firm* — Marshall & Melhorn, LLC

(57) ABSTRACT

A king-pin joint assembly used in a vehicle. The king-pin joint assembly includes a king-pin, an axle beam and a steering knuckle. At least a portion of an intermediate portion of the king-pin is received and/or retained within at least a portion of an axle beam king-pin receiving aperture in a connector portion of the axle beam. The steering knuckle has a yoke portion with a first yoke arm and a second yoke arm. At least a portion of a first bearing assembly and a first end portion of the king-pin is received and/or retained within at least a portion of a first yoke arm king-pin aperture in the first yoke arm. Additionally, least a portion of a second bearing assembly and a second end portion of the king-pin is received and/or retained within at least a portion of a second yoke arm king-pin aperture in the second yoke arm.

20 Claims, 9 Drawing Sheets

(56) References Cited

U.S. PATENT DOCUMENTS

| | | | | |
|---|---|---|---|---|
| 3,479,051 A * | | 11/1969 | Weiss | B62D 7/18 280/93.512 |
| 3,542,392 A * | | 11/1970 | Cumming | F16C 11/04 280/93.512 |
| 3,689,100 A * | | 9/1972 | Schmid | B62D 7/16 280/93.511 |
| 3,980,151 A * | | 9/1976 | Murayama | B60K 17/08 180/261 |
| 3,981,513 A * | | 9/1976 | Erskine | B62D 7/06 280/93.512 |
| 4,301,886 A * | | 11/1981 | Kinoshita | B60B 35/14 180/233 |
| 4,635,952 A * | | 1/1987 | Smith | B62D 7/18 280/93.512 |
| 4,690,418 A * | | 9/1987 | Smith | B62D 7/18 280/93.512 |
| 4,798,394 A * | | 1/1989 | Pollock | B62D 7/18 280/93.512 |
| 5,195,605 A * | | 3/1993 | Wood | B60K 17/306 180/254 |
| 5,529,420 A * | | 6/1996 | Henkel | B62D 7/16 403/135 |
| 5,709,399 A * | | 1/1998 | Smith, Jr. | B62D 7/18 280/93.512 |
| 5,722,784 A * | | 3/1998 | Link | B60G 7/008 280/93.512 |
| 5,803,621 A * | | 9/1998 | Assmann | B62D 7/18 384/607 |
| 5,975,547 A * | | 11/1999 | Stroh | B62D 7/18 280/93.512 |
| 6,029,986 A * | | 2/2000 | Bodin | B62D 7/18 280/93.512 |
| 6,113,118 A * | | 9/2000 | Zebolsky | B62D 7/18 280/93.512 |
| 6,217,046 B1 * | | 4/2001 | Bodin | B62D 7/18 280/93.512 |
| 6,623,019 B2 | | 9/2003 | Davis | |
| 6,827,359 B2 * | | 12/2004 | Barila | B62D 7/18 280/93.512 |
| 7,093,843 B2 | | 8/2006 | Varela et al. | |
| 7,163,217 B2 * | | 1/2007 | Bodin | B62D 7/18 280/89.1 |
| 7,458,725 B2 * | | 12/2008 | Katae | F16C 11/045 384/130 |
| 7,503,739 B2 * | | 3/2009 | Yoo | B62D 7/18 403/295 |
| 7,716,799 B2 * | | 5/2010 | Ebert | B62D 7/18 29/402.03 |
| 7,740,253 B2 * | | 6/2010 | Ziech | B62D 7/18 280/93.511 |
| 7,815,203 B2 * | | 10/2010 | Adleman | B60G 9/003 280/93.512 |
| 8,070,177 B2 | | 12/2011 | Eveley | |
| 8,490,986 B1 * | | 7/2013 | Ostrander | B62D 7/18 280/93.512 |
| 8,764,034 B2 | | 7/2014 | Wells et al. | |
| 9,096,259 B2 * | | 8/2015 | Varela | B62D 7/18 |
| 9,211,908 B2 * | | 12/2015 | Stjernling | B62D 7/18 |
| 9,598,104 B1 * | | 3/2017 | Lam | B62D 7/18 |
| 10,156,266 B2 * | | 12/2018 | Campbell | F16D 3/385 |
| 10,227,089 B2 * | | 3/2019 | Lee | B62D 7/228 |
| 2004/0188969 A1 * | | 9/2004 | Huhn | B62D 7/18 280/93.512 |
| 2010/0113166 A1 * | | 5/2010 | Overholt | F16C 21/005 464/136 |
| 2018/0057051 A1 * | | 3/2018 | Passero | B62D 15/023 |
| 2018/0273091 A1 * | | 9/2018 | Lam | B62D 7/18 |

* cited by examiner

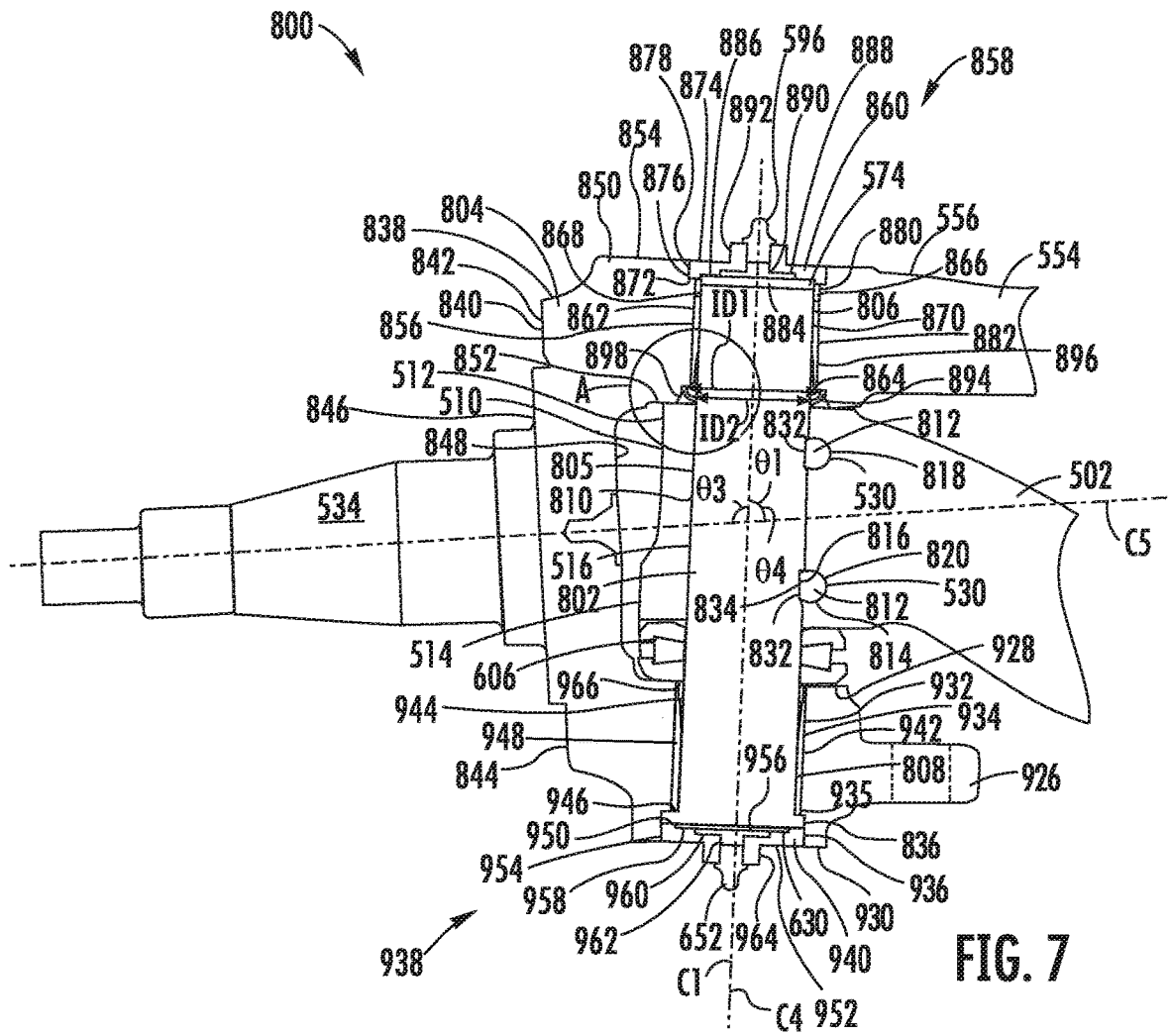
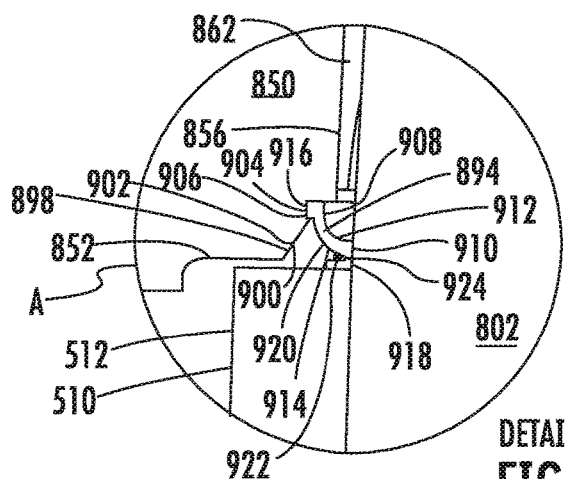
FIG. 7
DETAIL A
FIG. 7A

DETAIL A

KING-PIN JOINT ASSEMBLY

FIELD OF THE DISCLOSURE

The present disclosure relates to a king-pin joint assembly for use in a motor vehicle.

BACKGROUND OF THE DISCLOSURE

Within a conventional king-pin joint assembly, the king-pin is mounted in a substantially vertical orientation in order to connect an axle beam of a vehicle to a steering knuckle of the vehicle. The king-pin provides rigid and pivotable connection between the steering knuckle and the axle beam of the vehicle. As a result, an amount of force may be applied onto the steering knuckle via a steering arm thereby allowing the steering knuckle and a wheel assembly connected thereto to pivot relative to the axle beam of the vehicle.

Given the relatively large amount of loads exerted onto the king-pin joint assembly, the various components within the king-pin joint assembly experience a significant amount of wear over a relatively short amount of time. As a result, the various king-pin joint assemblies of a vehicle require regular maintenance and frequent replacement and/or repair of the components within the king-pin joint assemblies. It is well understood that the costs associated with the maintenance of fleet vehicles represents a significant portion of the overall costs associated with the ownership of a fleet of vehicles. Given the ongoing maintenance requirements for a conventional king-pin joint assembly, on top of the need for frequent replacement and/or repair of the components of a conventional king-pin joint assembly, the various king-pin joint assemblies of a vehicle contribute considerably to the overall maintenance costs for a fleet of vehicles. It would therefore be advantageous to develop a king-pin joint assembly that requires little to no maintenance, part replacements and/or repairs over the life of the king-pin joint assembly.

SUMMARY OF THE DISCLOSURE

A king-pin joint assembly for use in a vehicle. The king-pin joint assembly includes a king-pin, an axle beam and a steering knuckle. The axle beam includes a connector portion having a radially inboard end portion and a radially outboard end portion. Extending from the radially inboard end portion to the radially outboard end portion of the connector portion of the axle beam is an axle beam king-pin receiving aperture. The axle beam king-pin receiving aperture is of a size and shape to receive and/or retain at least a portion of an intermediate portion of the king-pin.

The steering knuckle of the king-pin joint includes a yoke portion having a first yoke arm and a second yoke arm. Extending from an inner surface to an outer surface of the first yoke arm is a first yoke arm king-pin aperture. At least a portion of a first end portion of the king-pin and a first bearing assembly is received and/or retained within at least a portion of first yoke arm king-pin aperture in the first yoke arm. Extending from an inner surface to an outer surface of the second yoke arm is a second yoke arm king-pin aperture. At least a portion of a second end portion of the king-pin a second bearing assembly is received and/or retained within at least a portion of the second yoke arm king-pin aperture in the second yoke arm of the steering knuckle.

BRIEF DESCRIPTION OF THE DRAWINGS

The above, as well as other advantages of the present disclosure, will become readily apparent to those skilled in the art from the following detailed description when considered in light of the accompanying drawings in which:

FIG. 7 is a partial cut-away schematic side-view of the king-pin joint assembly illustrated in FIGS. 5 and 6 according to another embodiment of the disclosure;

FIG. 7A is a detail view of a portion of the king-pin joint assembly illustrated in FIG. 7 of the disclosure.

DETAILED DESCRIPTION OF THE DISCLOSURE

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments of the invention disclosed are not to be considered as limiting, unless expressly stated otherwise.

It is within the scope of this disclosure, and as a non-limiting example, that the king-pin joint assembly disclosed herein may be used in automotive, off-road vehicle, all-terrain vehicle, construction, structural, marine, aerospace, locomotive, military, machinery, robotic and/or consumer product applications. Additionally, as a non-limiting example, the king-pin joint assembly disclosed herein may also be used in passenger vehicle, electric vehicle, hybrid vehicle, commercial vehicle, autonomous vehicles, semi-autonomous vehicles and/or heavy vehicle applications.

Figure 1:
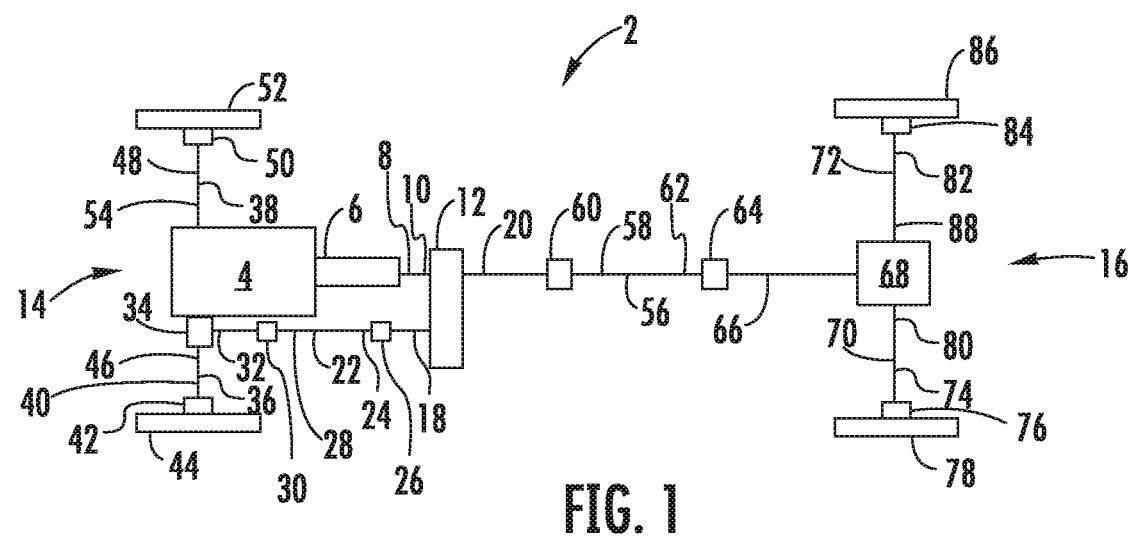
FIG. 1 is a schematic top-plan view of a vehicle having one or more king-pin joint assemblies according to an embodiment of the disclosure.

FIG. 1 is a schematic top-plan view of a vehicle 2 having one or more king-pin joint assemblies according to an embodiment of the disclosure. The vehicle 2 has an engine 4 which is drivingly connected to a transmission 6. A transmission output shaft 8 is then drivingly connected to an end of the transmission 6 opposite the engine 4. The transmission 6 is a power management system which provides controlled application of the rotational energy generated by the engine 4 by means of a gearbox.

The transmission output shaft 8 is drivingly connected to a transfer case input shaft 10 which in turn is drivingly connected to a transfer case 12. The transfer case 12 is used in four-wheel drive and/or all-wheel-drive (AWD) vehicles to transfer the rotational power from the transmission 6 to a front axle system 14 and a rear axle system 16 by utilizing a series of gears and drive shafts. Additionally, the transfer case 12 allows the vehicle to selectively operate in either a two-wheel drive mode of a four-wheel/AWD mode. The transfer case 12 includes a first transfer case output shaft 18 and a second transfer case output shaft 20.

A first drive shaft 22 extends from the first transfer case output shaft 18 to the front axle system 14 of the vehicle 2. A first end portion 24 of the first drive shaft 22 is drivingly connected to an end of the first transfer case output shaft 18 opposite the transfer case 12 via a first coupling assembly 26. As a non-limiting example, the first coupling assembly 26 may be a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly. A second end portion 28 of the first drive shaft 22 is drivingly connected to a second coupling assembly 30. As a non-limiting example, the second coupling assembly 30 may be a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the second coupling assembly 30, opposite the first drive shaft, is an end of a front axle system input shaft 32. As a non-limiting example, the front axle system input shaft 32 may be a front axle differential input shaft, a coupling shaft, stub shaft or a front axle differential pinion shaft. Drivingly connected to an end of the front axle system input shaft 32, opposite the second coupling assembly 30, is a front axle differential 34. The front axle differential 34 is a set of gears that allows the outer drive wheel(s) of the vehicle 2 to rotate at a faster rate that the inner drive wheel(s). The rotational power is transmitted through the front axle system 14 as described in more detail below.

The front axle system 14 further includes a first front axle half shaft 36 and a second front axle half shaft 38. The first front axle half shaft 36 extends substantially perpendicular to the front axle system input shaft 32. A first end portion 40 of the first front axle half shaft 36 is drivingly connected to a first front axle wheel end assembly 42. Drivingly connected to at least a portion of the first front axle wheel end assembly 42 is a first front axle wheel assembly 44. A second end portion 46 of the first front axle half shaft 36 is drivingly connected to an end of the front axle differential 34. As a non-limiting example, the second end portion 46 of the first front axle half shaft 36 is drivingly connected to a front axle differential side gear, a separate stub shaft, a separate coupling shaft, a first front axle differential output shaft and/or a shaft that is formed as part of a front axle differential side gear.

The second front axle half shaft 38 extends substantially perpendicular to the front axle system input shaft 32. A first end portion 48 of the second front axle half shaft 38 is drivingly connected to a second front axle wheel end assembly 50. Drivingly connected to at least a portion of the second front axle wheel end assembly 50 is a second front axle wheel assembly 52. A second end portion 54 of the second front axle half shaft 38 is drivingly connected to an end of the front axle differential 34 opposite the first front axle half shaft 36. As a non-limiting example, the second end portion 54 of the second front axle half shaft 38 may be drivingly connected to a front axle differential side gear, a separate stub shaft, a separate coupling shaft, a second front axle differential output shaft and/or a shaft that is formed as part of a front axle differential side gear.

An end of the second transfer case output shaft 20 is drivingly connected to an end of the transfer case 12 opposite the transfer case input shaft 10. A second drive shaft 56 extends from the second transfer case output shaft 20 to the rear axle system 16 of the vehicle 2. A first end portion 58 of the second drive shaft 56 is drivingly connected to an end of the second transfer case output shaft 20 opposite the transfer case 12 via a third coupling assembly 60. As a non-limiting example, the third coupling assembly 60 may be a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly. A second end portion 62 of the second drive shaft 56 is drivingly connected to a fourth coupling assembly 64. As a non-limiting example, the fourth coupling assembly 64 may be a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the fourth coupling assembly 64, opposite the second drive shaft 56, is an end of a rear axle system input shaft 66. As a non-limiting example, the rear axle system input shaft 66 may be a rear axle differential input shaft, a coupling shaft, stub shaft or a rear axle differential pinion shaft. Drivingly connected to an end of the rear axle system input shaft 66, opposite the second drive shaft 56, is a rear axle differential assembly 68. The rear axle differential assembly 68 is a set of gears that allows the outer drive wheel(s) of the vehicle 2 to rotate at a faster rate that the inner drive wheel(s). The rotational power is transmitted through the rear axle system 16 as described in more detail below.

The rear axle system 16 further includes a first rear axle half shaft 70 and a second rear axle half shaft 72. The first rear axle half shaft 70 extends substantially perpendicular to the rear axle system input shaft 66. A first end portion 74 of the first rear axle half shaft 70 is drivingly connected to a first rear axle wheel end assembly 76. Drivingly connected to at least a portion of the first rear axle wheel end assembly 76 is a first rear axle wheel assembly 78. A second end portion 80 of the first rear axle half shaft 70 is drivingly connected to an end of the rear axle differential 80. As a non-limiting example, the second end portion 80 of the first rear axle half shaft 70 may be drivingly connected to a rear axle differential side gear, a separate stub shaft, a separate coupling shaft, a first rear axle differential output shaft and/or a shaft that is formed as part of a rear axle differential side gear.

The second rear axle half shaft 72 extends substantially perpendicular to the rear axle system input shaft 66. A first end portion 82 of the second rear axle half shaft 72 is drivingly connected to a second rear axle wheel end assembly 84. Drivingly connected to at least a portion of the second rear axle wheel end assembly 84 is a second rear axle wheel assembly 86. A second end portion 88 of the second rear axle half shaft 72 is drivingly connected to an end of the rear axle differential assembly 68 opposite the first rear axle half shaft 70. As a non-limiting example, the second end portion 88 of the second rear axle half shaft 72 may be drivingly connected to a rear axle differential side gear, a separate stub shaft, a separate coupling shaft, a second rear axle differential output shaft and/or a shaft that is formed as part of a rear axle differential side gear.

It is within the scope of this disclosure that the first front axle wheel end assembly 42, the second front axle wheel end assembly 50, the first rear axle wheel end assembly 76 and/or the second rear axle wheel end assembly 84 may include a king-pin joint assembly according to an embodiment of the disclosure.

Figure 2:
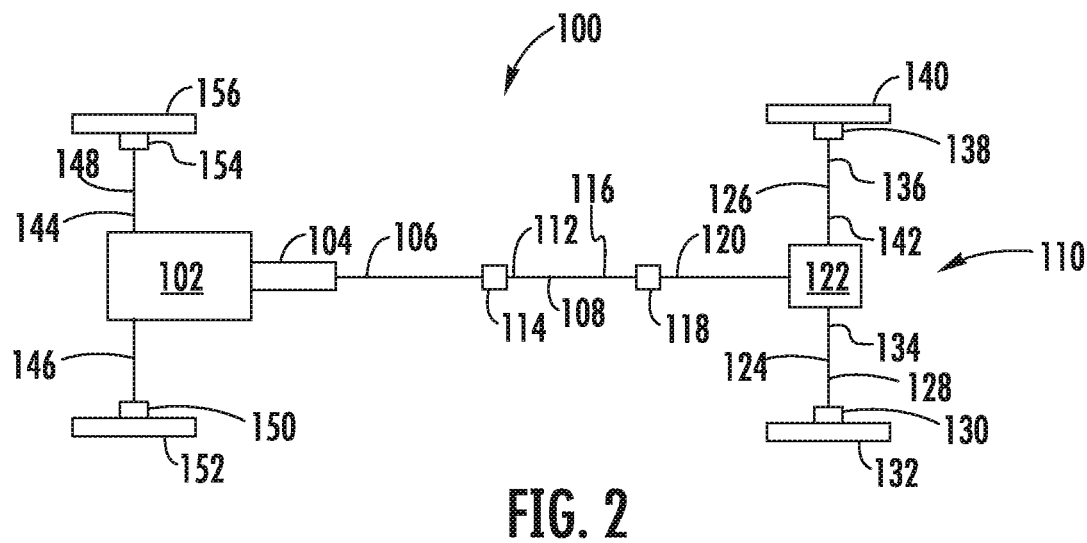
FIG. 2 is a schematic top-plan view of another vehicle having one or more king-pin joint assemblies according to an embodiment of the disclosure.

FIG. 2 is a schematic top-plan view of a vehicle 100 having one or more king-pin joint assemblies according to an embodiment of the disclosure. The vehicle 100 has an engine 102 which is drivingly connected to a transmission 104. A transmission output shaft 106 is then drivingly connected to an end of the transmission 106 opposite the engine 102. The transmission 104 is a power management system which provides controlled application of the rotational power generated by the engine 102 by means of a gear box.

A drive shaft 108 extends from the transmission output shaft 106 and drivingly connects the transmission 104 to a rear axle system 110. A first end portion 112 of the drive shaft 108 is drivingly connected to the end of the transmission output shaft 106 opposite the transmission 104 via a first coupling assembly 114. As a non-limiting example, the first coupling assembly 114 may be a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly. A second end portion 116 of the drive shaft 108 is drivingly connected to a second coupling assembly 118. As a non-limiting example, the second coupling assembly 118 may be a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the second coupling assembly 118, opposite the drive shaft 108, is an end of a rear axle input shaft 120. As a non-limiting example, the rear axle input shaft 120 may be a differential input shaft, a coupling shaft, stub shaft or a differential pinion shaft. Drivingly connected to an end of the rear axle input shaft 120, opposite the second coupling assembly 118, is a rear axle differential assembly 122. The rear axle differential assembly 122 is a set of gears that allows the outer drive wheel(s) of the vehicle 100 to rotate at a faster rate that the inner drive wheel(s). The rotational power is transmitted through the rear axle system 110 as described in more detail below.

The rear axle system 110 further includes a first rear axle half shaft 124 and a second rear axle half shaft 126. The first rear axle half shaft 124 extends substantially perpendicular to the rear axle system input shaft 120. A first end portion 128 of the first rear axle half shaft 124 is drivingly connected to a first rear axle wheel end assembly 130. Drivingly connected to at least a portion of the first rear axle wheel end assembly 130 is a first rear axle wheel assembly 132. A second end portion 134 of the first rear axle half shaft 124 is drivingly connected to an end of the rear axle differential assembly 122. As a non-limiting example, the second end portion 134 of the first rear axle half shaft 124 may be drivingly connected to a rear axle differential side gear, a separate stub shaft, a separate coupling shaft, a first rear axle differential output shaft and/or a shaft that is formed as part of a rear axle differential side gear.

The second rear axle half shaft 126 extends substantially perpendicular to the rear axle system input shaft 120. A first end portion 136 of the second rear axle half shaft 126 is drivingly connected to a second rear axle wheel end assembly 138. Drivingly connected to at least a portion of the second rear axle wheel end assembly 138 is a second rear axle wheel assembly 140. A second end portion 142 of the second rear axle half shaft 126 is drivingly connected to an end of the rear axle differential assembly 122 opposite the first rear axle half shaft 124. As a non-limiting example, the second end portion 142 of the second rear axle half shaft 126 may be drivingly connected to a rear axle differential side gear, a separate stub shaft, a separate coupling shaft, a second rear axle differential output shaft and/or a shaft that is formed as part of a rear axle differential side gear.

As illustrated in FIG. 2 of the disclosure, the vehicle 100 further includes a front axle beam 144 having a first end portion 146 and a second end portion 148. The first end portion 146 of the front axle beam 144 is a first front axle beam wheel end assembly 150. Drivingly connected to at least a portion of the first front axle beam wheel end assembly 150 is a first front axle beam wheel assembly 152. The second end portion 148 of the front axle beam 144 is a second front axle beam wheel end assembly 154. Drivingly connected to at least a portion of the second front axle beam wheel end assembly 154 is a second front axle beam wheel assembly 156.

It is within the scope of this disclosure that the first front axle beam wheel end assembly 150, the second front axle beam wheel end assembly 154, the first rear axle wheel end assembly 130 and/or the second rear axle wheel end assembly 138 may include a king-pin joint assembly according to an embodiment of the disclosure.

Figure 3:
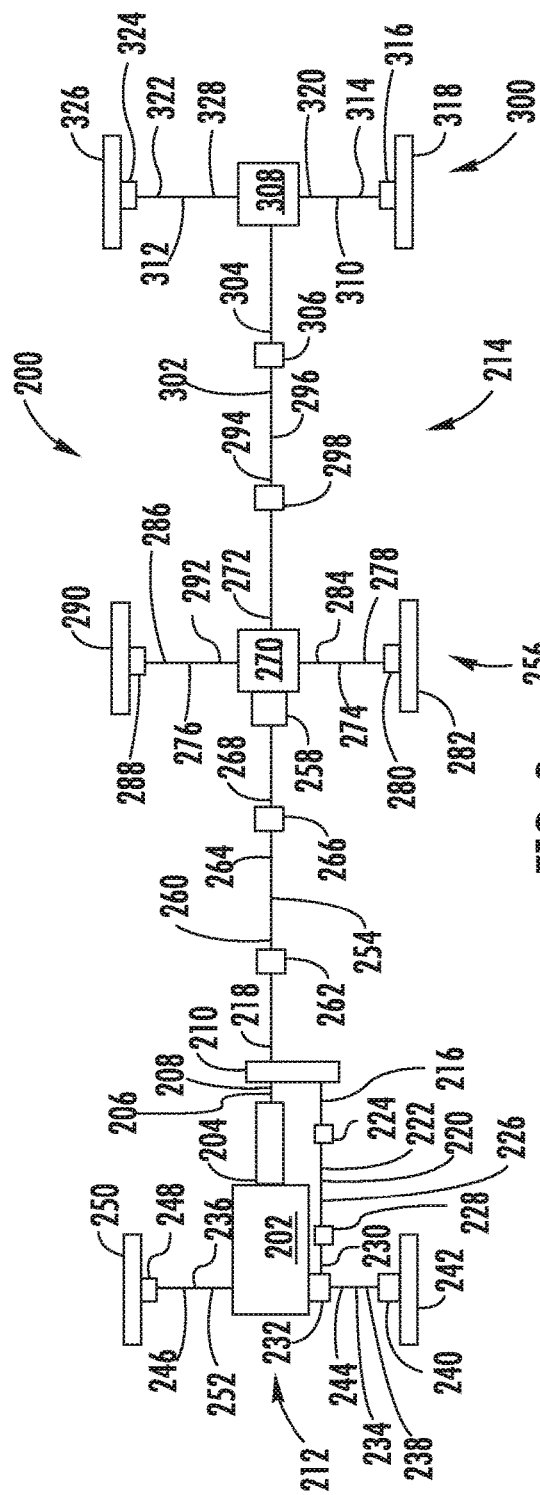
FIG. 3 is a schematic top-plan view of yet another vehicle having one or more king-pin joint assemblies according to an embodiment of the disclosure.

FIG. 3 is a schematic top-plan view of a vehicle 200 having one or more king-pin joint assemblies according to an embodiment of the disclosure. The vehicle 200 has an engine 202 which is drivingly connected to a transmission 204. A transmission output shaft 206 is drivingly connected to an end of the transmission 204 opposite the engine 202. The transmission 204 is a power management system which provides controlled application of the rotational power generated by the engine by means of a gear box.

The transmission output shaft 206 is drivingly connected to a transfer case input shaft 208 which in turn is drivingly connected to a transfer case 210. The transfer case 210 is used to transfer the rotational power from the transmission 204 to a front axle system 212 and a tandem axle system 214 by utilizing a series of gears and drive shafts. The transfer case 210 includes a first transfer case output 216 shaft and a second transfer case output shaft 218.

A first drive shaft 220 extends from the first transfer case output shaft 216 to the front axle system 212 of the vehicle 200. A first end portion 222 of the first drive shaft 220 is drivingly connected to an end of the first transfer case output shaft 216 opposite the transfer case 210 via a first coupling assembly 224. As a non-limiting example, the first coupling assembly 224 may be a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly. A second end portion 226 of the first drive shaft 220 is drivingly connected to a second coupling assembly 228. As a non-limiting example, the second coupling assembly 228 may be a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the second coupling assembly 228 is an end of a front axle system input shaft 230. As a non-limiting example, the front axle system input shaft 230 may be a front axle differential input shaft, a coupling shaft, stub shaft or a front axle differential pinion shaft. Drivingly connected to an end of the front axle system input shaft 230, opposite the first drive shaft 220, is a front axle differential 232. The front axle differential 232 is a set of gears that allows the outer drive wheel(s) of the vehicle to rotate at a faster rate that the inner drive wheel(s). The rotational power is transmitted through the front axle system 212 as described in more detail below.

The front axle system 212 further includes a first front axle half shaft 234 and a second front axle half shaft 236. The first front axle half shaft 234 extends substantially perpendicular to the front axle system input shaft 230. A first end portion 238 of the first front axle half shaft 234 is drivingly connected to a first front axle wheel end assembly 240. Drivingly connected to at least a portion of the first front axle wheel end assembly 240 is a first front axle wheel assembly 242. A second end portion 244 of the first front axle half shaft 234 is drivingly connected to an end of the front axle differential 232. As a non-limiting example, the second end portion 244 of the first front axle half shaft 234 may be drivingly connected to a front axle differential side gear, a separate stub shaft, a separate coupling shaft, a first front axle differential output shaft and/or a shaft that is formed as part of a front axle differential side gear.

The second front axle half shaft 236 extends substantially perpendicular to the front axle system input shaft 230. A first end portion 246 of the second front axle half shaft 236 is drivingly connected to a second front axle wheel end assembly 248. Drivingly connected to at least a portion of the second front axle wheel end assembly 248 is a second front axle wheel assembly 250. A second end portion 252 of the second front axle half shaft 236 is drivingly connected to an end of the front axle differential 232 opposite the first front axle half shaft 234. As a non-limiting example, the second end portion 252 of the second front axle half shaft 236 may be drivingly connected to a front axle differential side gear, a separate stub shaft, a separate coupling shaft, a second front axle differential output shaft and/or a shaft that is formed as part of a front axle differential side gear.

An end of the second transfer case output shaft 218 is drivingly connected to an end of the transfer case 210 opposite the transfer case input shaft 208. A second drive shaft 254 extends from the second transfer case output shaft 218 and drivingly connects the transfer case 210 to a forward tandem axle system 256 having an inter-axle differential assembly 258. As illustrated in FIG. 3 of the disclosure, a first end portion 260 of the second drive shaft 254 is drivingly connected to an end of the second transfer case output shaft 218 opposite the transfer case 210 via a third coupling assembly 262. As non-limiting example, the third coupling assembly 262 may be a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

A second end portion 264 of the second drive shaft 254 is drivingly connected to a fourth coupling assembly 266. As a non-limiting example, the fourth coupling assembly 266 may be a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the fourth coupling assembly 266, opposite the second drive shaft 254, is an end of a forward tandem axle system input shaft 268. An end of the forward tandem axle system input shaft 268, opposite the second drive shaft 254, is drivingly connected to the inter-axle differential assembly 258. As a non-limiting example, the forward tandem axle system input shaft 268 may be an inter-axle differential input shaft, a coupling shaft, stub shaft or an inter-axle differential pinion shaft. The inter-axle differential assembly 258 is a device that divides the rotational power generated by the engine 202 between the axles in a vehicle 200. The rotational power is transmitted through the forward tandem axle system 256 as described in more detail below.

As illustrated in FIG. 3 of the disclosure, the inter-axle differential assembly 258 is drivingly connected to a forward tandem axle differential 270 and a forward tandem axle system output shaft 272. The forward tandem axle differential 270 is a set of gears that allows the outer drive wheel(s) of a vehicle to rotate at a faster rate than the inner drive wheel(s).

The forward tandem axle system 256 further includes a first forward tandem axle half shaft 274 and a second forward tandem axle half shaft 276. The first forward tandem axle half shaft 274 extends substantially perpendicular to the forward tandem axle system input shaft 268. A first end portion 278 of the first forward tandem axle half shaft 274 is drivingly connected to a first forward tandem axle wheel end assembly 280. Drivingly connected to at least a portion of the first forward tandem axle wheel end assembly 280 is a first forward tandem axle wheel assembly 282. A second end portion 284 of the first forward tandem axle half shaft 274 is drivingly connected to an end of the forward tandem axle differential 270. As a non-limiting example, the second end portion 284 of the first forward tandem axle half shaft 274 may be drivingly connected to a forward tandem axle differential side gear, a separate stub shaft, a separate coupling shaft, a first forward tandem axle differential output shaft and/or a shaft that is formed as part of a forward tandem axle differential side gear.

Extending substantially perpendicular to the forward tandem axle input shaft 268 is the second forward tandem axle half shaft 276. A first end portion 286 of the second forward tandem axle half shaft 276 is drivingly connected to a second forward tandem axle wheel end assembly 288. Drivingly connected to at least a portion of the second forward tandem axle wheel end assembly 288 is a second forward tandem axle wheel assembly 290. A second end portion 292 of the second forward tandem axle half shaft 276 is drivingly connected to an end of the forward tandem axle differential 270 opposite the first forward tandem axle half shaft 274. As a non-limiting example, the second end portion 292 of the second forward tandem axle half shaft 276 may be drivingly connected to a forward tandem axle differential side gear, a separate stub shaft, a separate coupling shaft, a second forward tandem axle differential output shaft and/or a shaft that is formed as part of a forward tandem axle differential side gear.

One end of the forward tandem axle system output shaft 272 is drivingly connected to a side of the inter-axle differential assembly 258 opposite the second drive shaft 254. An end of the forward tandem axle system output shaft 272, opposite the inter-axle differential assembly 258, is drivingly connected to a first end portion 294 of a third drive shaft 296 via a fifth coupling assembly 298. As a non-limiting example, the fifth coupling assembly 298 may be a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly. The third drive shaft 296 drivingly connects the forward tandem axle system 256 to a rear tandem axle system 300 of the vehicle 200.

A second end portion 302 of the third drive shaft 296 is drivingly connected to an end of a rear tandem axle system input shaft 304 via a sixth coupling assembly 306. As a non-limiting example, the sixth coupling assembly 306 may be a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the sixth coupling assembly 306, opposite the third drive shaft 296, is an end of the rear tandem axle system input shaft 304. As a non-limiting example, the rear tandem axle input shaft 304 may be a rear tandem axle differential input shaft, a coupling shaft, stub shaft or a rear tandem axle differential pinion shaft. Drivingly connected to an end of the rear tandem axle input shaft 304, opposite the third drive shaft 296, is a rear tandem axle differential assembly 308. The rear tandem axle differential assembly 308 is a set of gears that allows the outer drive wheel(s) of the vehicle to rotate at a faster rate that the inner drive wheel(s). The rotational power is transmitted through the rear tandem axle system 300 as described in more detail below.

The rear tandem axle system 300 further includes a first rear tandem axle half shaft 310 and a second rear tandem axle half shaft 312. The first rear tandem axle half shaft 314 extends substantially perpendicular to the rear tandem axle system input shaft 304. A first end portion 314 of the first rear tandem axle half shaft 310 is drivingly connected to a first rear tandem axle wheel end assembly 316. Drivingly connected to at least a portion of the first rear tandem axle wheel end assembly 316 is a first rear tandem axle wheel assembly 318. A second end portion 320 of the first rear tandem axle half shaft 310 is drivingly connected to an end of the rear tandem axle differential assembly 308. As a non-limiting example, the second end portion 320 of the first rear tandem axle half shaft 310 may be drivingly connected to a rear tandem axle differential side gear, a separate stub shaft, a separate coupling shaft, a first rear tandem axle differential output shaft and/or a shaft that is formed as part of a rear tandem axle differential side gear.

Extending substantially perpendicular to the rear tandem axle system input shaft 304 is the second forward tandem axle half shaft 312. A first end portion 322 of the second rear tandem axle half shaft 312 is drivingly connected to a second rear tandem axle wheel end assembly 324. Drivingly connected to at least a portion of the second rear tandem axle wheel end assembly 324 is a second rear tandem axle wheel assembly 326. A second end portion 328 of the second rear tandem axle half shaft 312 is drivingly connected to an end of the rear tandem axle differential assembly 308 opposite the first rear tandem axle half shaft 310. As a non-limiting example, the second end portion 312 of the second rear tandem axle half shaft 312 may be drivingly connected to a rear tandem axle differential side gear, a separate stub shaft, a separate coupling shaft, a second rear tandem axle differential output shaft and/or a shaft that is formed as part of a rear tandem axle differential side gear.

It is within the scope of this disclosure that the first front axle wheel end assembly 240, the second front axle wheel end assembly 248, the first forward tandem axle wheel end assembly 280, the second forward tandem axle wheel end assembly 288, the first rear tandem axle wheel end assembly 316 and/or the second rear tandem axle wheel end assembly 324 may include a king-pin joint assembly according to an embodiment of the disclosure.

Figure 4:
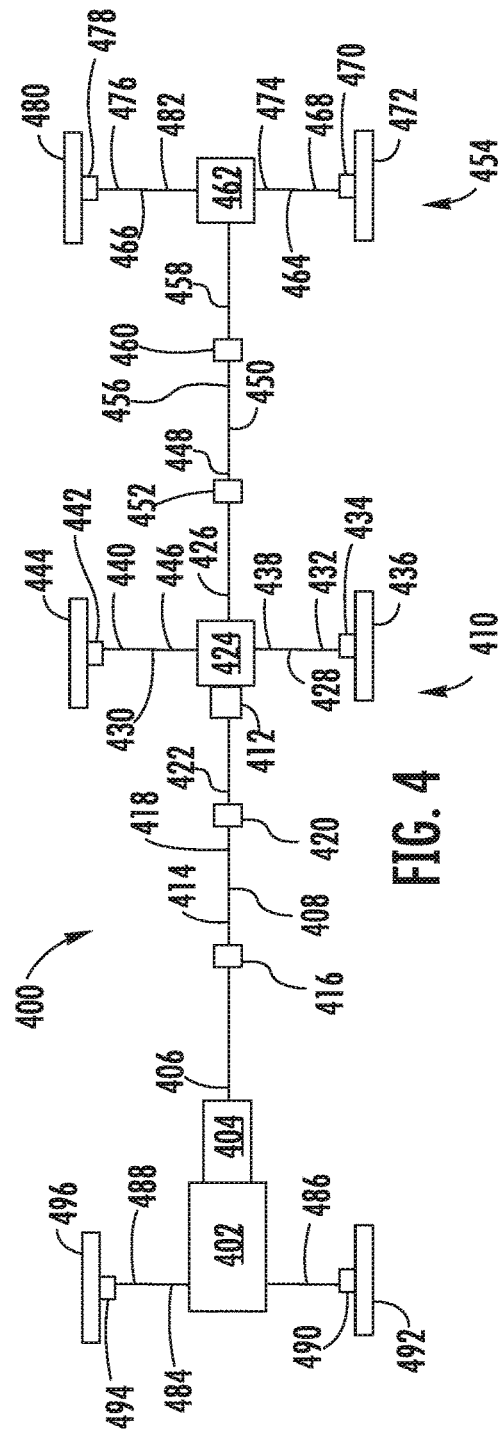
FIG. 4 is a schematic top-plan view of still another vehicle having one or more king-pin joint assemblies according to an embodiment of the disclosure.

FIG. 4 is a schematic top-plan view of still a vehicle 400 having one or more king-pin joint assemblies according to an embodiment of the disclosure. The vehicle 400 has an engine 402 which is drivingly connected to a transmission 404. A transmission output shaft 406 is drivingly connected to an end of the transmission 404 opposite the engine 402. The transmission 404 is a power management system which provides controlled application of the rotational power generated by the engine by means of a gear box.

A first drive shaft 408 extends from the transmission output shaft 406 and drivingly connects the transmission 404 to a forward tandem axle system 410 having an inter-axle differential assembly 412. As illustrated in FIG. 4 of the disclosure, a first end portion 414 of the first drive shaft 408 is drivingly connected to an end of the transmission output shaft 406 opposite the transmission 404 via a first coupling assembly 416. As non-limiting example, the first coupling assembly 416 may be a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

A second end portion 418 of the first drive shaft 408 is drivingly connected to a second coupling assembly 420. As a non-limiting example, the second coupling assembly 420 may be a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the second coupling assembly 420 is an end of a forward tandem axle system input shaft 422. An end of the forward tandem axle system input shaft 422, opposite the first drive shaft 408, is drivingly connected to the inter-axle differential assembly 412. As a non-limiting example, the forward tandem axle system input shaft 422 may be an inter-axle differential input shaft, a coupling shaft, stub shaft or an inter-axle differential pinion shaft. The inter-axle differential assembly 412 is a device that divides the rotational power generated by the engine 402 between the axles in a vehicle 400. The rotational power is transmitted through the forward tandem axle system 410 as described in more detail below.

As illustrated in FIG. 4 of the disclosure, the inter-axle differential assembly 412 is drivingly connected to a forward tandem axle differential assembly 424 and a forward tandem axle system output shaft 426. The forward tandem axle differential assembly 424 is a set of gears that allows the outer drive wheel(s) of a vehicle to rotate at a faster rate than the inner drive wheel(s).

The forward tandem axle system 410 further includes a first forward tandem axle half shaft 428 and a second forward tandem axle half shaft 430. The first forward tandem axle half shaft 428 extends substantially perpendicular to the forward tandem axle system input shaft 422. A first end portion 432 of the first forward tandem axle half shaft 428 is drivingly connected to a first forward tandem axle wheel end assembly 434. Drivingly connected to at least a portion of the first forward tandem axle wheel end assembly 434 is a first forward tandem axle wheel assembly 436. A second end portion 438 of the first forward tandem axle half shaft 428 is drivingly connected to an end of the forward tandem axle differential assembly 424. As a non-limiting example, the second end portion 438 of the first forward tandem axle half shaft 428 may be drivingly connected to a forward tandem axle differential side gear, a separate stub shaft, a separate coupling shaft, a first forward tandem axle differential output shaft and/or a shaft that is formed as part of a forward tandem axle differential side gear.

Extending substantially perpendicular to the forward tandem axle input shaft 422 is the second forward tandem axle half shaft 430. A first end portion 440 of the second forward tandem axle half shaft 430 is drivingly connected to a second forward tandem axle wheel end assembly 442. Drivingly connected to at least a portion of the second forward tandem axle wheel end assembly 442 is a second forward tandem axle wheel assembly 444. A second end portion 446 of the second forward tandem axle half shaft 430 is drivingly connected to an end of the forward tandem axle differential assembly 424 opposite the first forward tandem axle half shaft 428. As a non-limiting example, the second end portion 446 of the second forward tandem axle half shaft 430 may be drivingly connected to a forward tandem axle differential side gear, a separate stub shaft, a separate coupling shaft, a second forward tandem axle differential output shaft and/or a shaft that is formed as part of a forward tandem axle differential side gear.

One end of the forward tandem axle system output shaft 426 is drivingly connected to a side of the inter-axle differential assembly 412 opposite the first drive shaft 408. An end of the forward tandem axle system output shaft 426, opposite the inter-axle differential assembly 412, is drivingly connected to a first end 448 of a second drive shaft 450 via a third coupling assembly 452. As a non-limiting example, the third coupling assembly 452 may be a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly. The second drive shaft 450 drivingly connects the forward tandem axle system 410 to a rear tandem axle system 454 of the vehicle 400.

A second end portion 456 of the second drive shaft 450 is drivingly connected to an end of a rear tandem axle system input shaft 458 via a fourth coupling assembly 460. As a non-limiting example, the fourth coupling assembly 460 may be a universal joint assembly, a U-joint assembly, a universal coupling assembly, a cardan joint assembly, a double cardan joint assembly, a Hooke's joint assembly, a Spicer joint assembly, a homokinetic coupling assembly, a constant velocity joint assembly or a Hardy Spicer joint assembly.

Drivingly connected to an end of the fourth coupling assembly 460, opposite the second drive shaft 450, is an end of the rear tandem axle system input shaft 458. As a non-limiting example, the rear tandem axle input shaft 458 may be a rear tandem axle differential input shaft, a coupling shaft, stub shaft or a rear tandem axle differential pinion shaft. Drivingly connected to an end of the rear tandem axle input shaft 458, opposite the second drive shaft 450, is a rear tandem axle differential assembly 462. The rear tandem axle differential assembly 462 is a set of gears that allows the outer drive wheel(s) of the vehicle to rotate at a faster rate that the inner drive wheel(s). The rotational power is transmitted through the rear tandem axle system 454 as described in more detail below.

The rear tandem axle system 454 further includes a first rear tandem axle half shaft 464 and a second rear tandem axle half shaft 466. The first rear tandem axle half shaft 464 extends substantially perpendicular to the rear tandem axle system input shaft 458. A first end portion 468 of the first rear tandem axle half shaft 464 is drivingly connected to a first rear tandem axle wheel end assembly 470. Drivingly connected to at least a portion of the first rear tandem axle wheel end assembly 470 is a first rear tandem axle wheel assembly 472. A second end portion 474 of the first rear tandem axle half shaft 464 is drivingly connected to an end of the rear tandem axle differential assembly 462. As a non-limiting example, the second end portion 474 of the first rear tandem axle half shaft 464 may be drivingly connected to a rear tandem axle differential side gear, a separate stub shaft, a separate coupling shaft, a first rear tandem axle differential output shaft and/or a shaft that is formed as part of a rear tandem axle differential side gear.

Extending substantially perpendicular to the rear tandem axle input shaft 458 is the second rear tandem axle half shaft 466. A first end portion 476 of the second rear tandem axle half shaft 466 is drivingly connected to a second rear tandem axle wheel end assembly 478. Drivingly connected to at least a portion of the second rear tandem axle wheel end assembly 478 is a second rear tandem axle wheel assembly 480. A second end portion 482 of the second rear tandem axle half shaft 466 is drivingly connected to an end of the rear tandem axle differential assembly 462 opposite the first rear tandem axle half shaft 464. As a non-limiting example, the second end portion 482 of the second rear tandem axle half shaft 466 may be drivingly connected to a rear tandem axle differential side gear, a separate stub shaft, a separate coupling shaft, a second rear tandem axle differential output shaft and/or a shaft that is formed as part of a rear tandem axle differential side gear.

As illustrated in FIG. 4 of the disclosure, the vehicle 400 further includes a front axle beam 484 having a first end portion 486 and a second end portion 488. The first end portion 486 of the front axle beam 484 is a first front axle beam wheel end assembly 490. Drivingly connected to at least a portion of the first front axle beam wheel end assembly 490 is a first front axle beam wheel assembly 492. The second end portion 488 of the front axle beam 484 is a second front axle beam wheel end assembly 494. Drivingly connected to at least a portion of the second front axle beam wheel end assembly 494 is a second front axle beam wheel assembly 496.

It is within the scope of this disclosure that the first front axle beam wheel end assembly 490, the second front axle beam wheel end assembly 494, the first forward tandem axle wheel end assembly 434, second forward tandem axle wheel end assembly 442, first rear tandem axle wheel end assembly 470 and/or the second rear tandem axle wheel end assembly 478 may include a king-pin joint assembly according to an embodiment of the disclosure.

Figure 5:
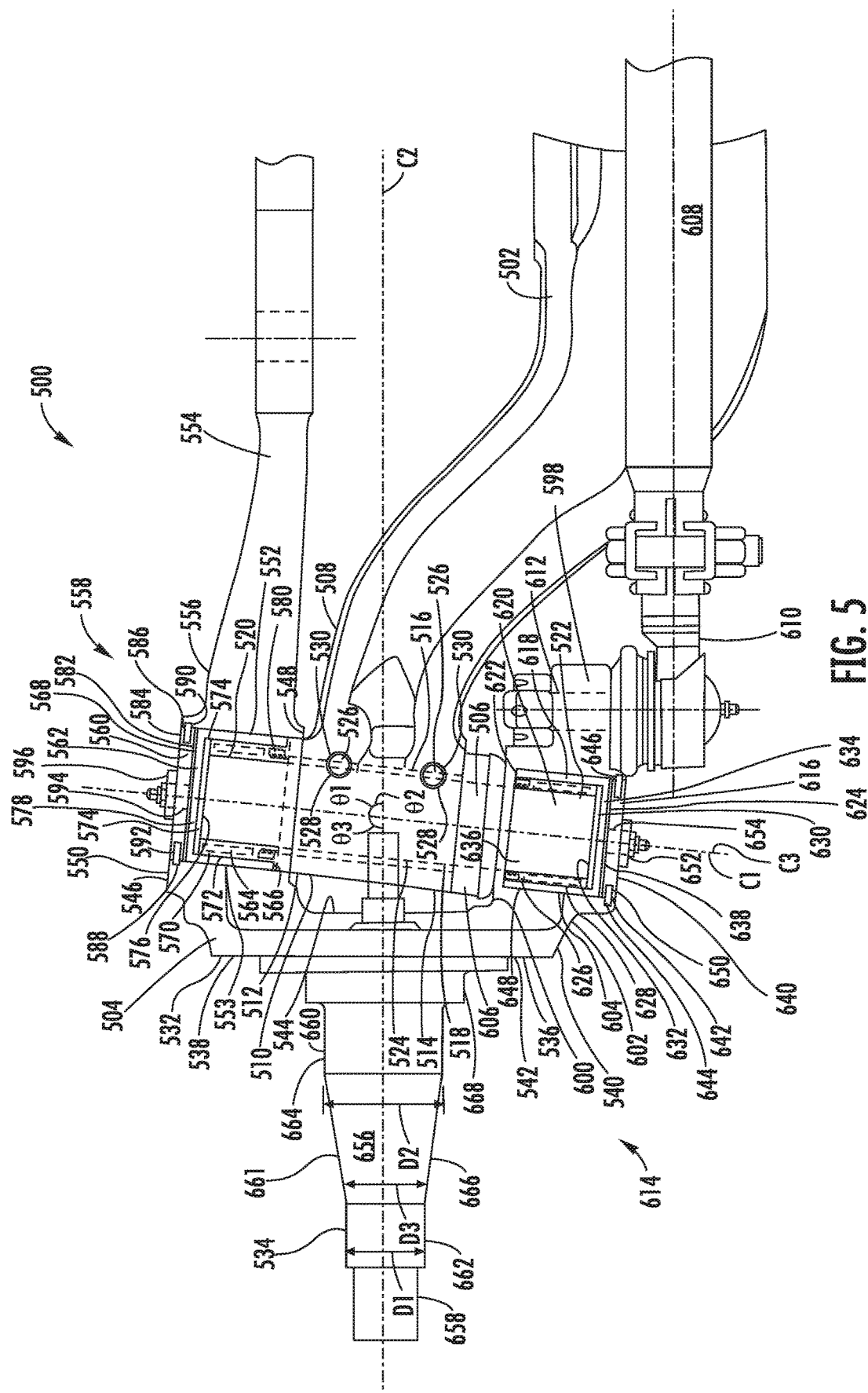
FIG. 5 is a partial cut-away schematic side-view of a king-pin joint assembly according to an embodiment of the disclosure.

FIG. 5 is a partial cut-away schematic side-view of a king-pin joint assembly 500 according to an embodiment of the disclosure. As illustrated in FIG. 5 of the disclosure and as a non-limiting example the king-pin joint assembly 500 includes an axle beam 502 that is pivotably connected to a steering knuckle 504 via a king-pin 506. The king-pin 506 of the king-pin joint assembly 500 provides a rigid and/or pivotable connection of the steering knuckle 504 to the axle beam 502. As a result, it is to be understood that the king-pin 506 of the king-pin joint assembly 500 provides the main pivot point for the steering mechanism of a vehicle (not shown). It is within the scope of this disclosure and as a non-limiting example that the axle beam of the king-pin joint assembly 500 may be a front axle beam, a rear axle beam, a forward tandem axle and/or a rear tandem axle beam. Additionally, it is within the scope of this disclosure and as a non-limiting example that the axle beam 502 may be a part of a front axle system, a rear axle system, a forward tandem axle system and/or a rear axle system.

As illustrated in FIG. 5 of the disclosure and as a non-limiting example, the axle beam 502 includes a first end portion 508 and a second end portion (not shown). At least a portion of the first end portion 508 of the axle beam 502 of the king-pin joint assembly 500 has a connector portion 510 having a radially outboard end portion 512 and a radially inboard end portion 514. The connector portion 510 of the axle bean 502 of the king-pin joint assembly 500 aids in providing the pivotable connection between the steering knuckle 504 and the axle beam 502.

Extending from the radially outboard end portion 512 to the radially inboard end portion 514 of the connector portion 510 of the axle beam 502 is an axle beam king-pin receiving aperture 516. The axle beam king-pin receiving aperture 516 of the connector portion 510 is of a size and shape to receive and/or retain at least a portion of the king-pin 506 of the king-pin joint assembly 500. As illustrated in FIG. 5 of the disclosure and as a non-limiting example, the axle beam king-pin receiving aperture 516 of the connector portion 510 of the axle beam 502 has a center-line C1 that is disposed at an angle θ1 relative to a center-line C2 of the steering knuckle 504 of the king-pin joint assembly 500. When king-pin joint assembly 500 is assembled, the king-pin 506 will have a center-line C3 that is substantially similar to the center-line C1 of the axle beam king-pin receiving aperture 516. Additionally, when the king-pin joint assembly 500 is assembled, the king-pin 506 will therefore be disposed at an angle θ2 relative to the center-line C2 of the steering knuckle 504. It is within the scope of this disclosure and as a non-limiting example that the angle θ2 of the king-pin 506 may be substantially equal to the angle θ1 of the axle beam king-pin receiving aperture 516 of the king-pin joint assembly 500.

As illustrated in FIG. 5 of the disclosure and as a non-limiting example, the king-pin 506 of the king-pin joint assembly 500 has an outer surface 518, first end portion 520, a second end portion 522 and an intermediate portion 524 interposed between the first and second end portions 520 and 522 of the king-pin 506. In order to retain at least a portion of the king-pin 506 within the axle beam king-pin receiving aperture 516 of the connector portion 510 of the axle beam 502, one or more draw keys 526 are used. As illustrated in FIG. 5 of the disclosure and as a non-limiting example, the one or more draw keys 526 of the king-pin joint assembly 500 extend substantially transverse to the center-line C1 of the axle beam king-pin receiving aperture 516 and the center-line C3 of the king-pin 506. It is within the scope of this disclosure and as a non-limiting example that the one or more draw keys 526 of the king-pin joint assembly 500 may be substantially cylindrical in shape.

At least a portion of the one or more draw-keys 526 of the king-pin assembly 500 are received and/or retained within at least a portion of one or more king-pin draw key grooves 528 extending along at least a portion of the outer surface 518 of the intermediate portion 524 of the king-pin 506. As illustrated in FIG. 5 of the disclosure and as a non-limiting example, the one or more king-pin draw key grooves 528 in the outer surface 518 of the king-pin 506 extend substantially transverse to the center-line C3 of the king-pin 506. The one or more king-pin draw key grooves 528 in the outer surface 518 of the king-pin 506 have a shape that is complementary to the shape of the one or more draw keys 526 of the king-pin joint assembly 500. As a result, it is therefore within the scope of this disclosure and as a non-limiting example that the one or more king-pin draw key grooves 528 in the outer surface 518 of the king-pin 506 may be substantially arcuate in shape.

Additionally, at least a portion of the one or more draw keys 524 of the king-pin joint assembly 500 are received and/or retained within at least a portion of one or more connector portion draw key apertures 530 within the connector portion 510 of the axle beam 502. As illustrated in FIG. 5 of the disclosure and as a non-limiting example, the one or more connector portion draw key apertures 530 in the connector portion 510 of the axle beam 502 of the king-pin joint assembly 500 are aligned with the one or more king-pin draw key grooves 528 in the intermediate portion 524 of the king-pin 506. It is therefore within the scope of this disclosure and as a non-limiting example that the one or more connector portion draw key apertures 530 extend substantially transverse to the center-line C1 of the axle beam king-pin receiving aperture 516 in the connector portion 510 of the axle beam 502 of the king-pin joint assembly 500. The one or more connector portion draw key apertures 530 in the connector portion 510 of the axle beam 502 have a shape that is complementary to the shape of the one or more draw keys 526 of the king-pin joint assembly 500. As a result, it is therefore within the scope of this disclosure and as a non-limiting example that the one or more connector portion draw key apertures 530 in the connector portion 510 of the axle beam 502 may be substantially arcuate in shape.

Disposed axially outboard from at least a portion of the axle beam 502 is the steering knuckle 504 of the king-pin joint assembly 500. As illustrated in FIG. 5 of the disclosure and as a non-limiting example, the steering knuckle 504 has a yoke portion 532 and a spindle portion 534. The yoke portion 532 of the steering knuckle 504 of the king-pin joint assembly 500 has a radially extending portion 536 having a radially outboard end portion 538, a radially inboard end portion 540, an axially outboard side 542 and an axially inboard side 544. The yoke portion 532 provides a rigid and/or pivotable connection between the steering knuckle 504, the king-pin 506 and the axle beam 502 of the king-pin joint assembly 500.

Extending outboard from at least a portion of the axially inboard side 544 of the radially outboard end portion 538 of the radially extending portion 536 of the yoke portion 532 of the steering knuckle 504 is a first yoke arm 546 of the steering knuckle 504. As illustrated in FIG. 5 of the disclosure and as a non-limiting example, the first yoke arm 546 of the yoke portion 532 of the steering knuckle 504 has an inner surface 548 and an outer surface 550. A first yoke arm king-pin aperture 552 extends from the inner surface 548 to the outer surface 550 of the first yoke arm 546 of the yoke portion 532 of the steering knuckle 504. The first yoke arm king-pin aperture 552 of the first yoke arm 546 is of a size and shape to receive and/or retain at least a portion of the first end portion 520 of the king-pin 506 of the king-pin joint assembly 500. It is therefore to be understood that at least a portion of the first end portion 520 of the king-pin 506 is disposed within at least a portion of the first yoke arm king-pin aperture 552 of the first yoke arm 546. In accordance with an embodiment of the disclosure illustrated in FIG. 5 and as a non-limiting example, the first yoke arm king-pin aperture 552 of the first yoke arm 546 may be substantially cylindrical in shape. Additionally, according to the embodiment of the disclosure illustrated in FIG. 5 and as a non-limiting example, at least a portion of the radially outboard end portion 512 of the connector portion 510 of the axle beam 502 is disposed within at least a portion of the first yoke arm king-pin aperture 552 of the first yoke arm 546.

A steering arm 554 having a first end portion 556 and a second end portion (not shown) extends from an end of the first yoke arm 546 of the yoke portion 532 of the steering knuckle 504 opposite the radially extending portion 536 of the steering knuckle 504 of the king-pin joint assembly 500. At least a portion of the second end portion (not shown) of the steering arm 554 is connected to at least a portion of a vehicle steering assembly (not shown). It is therefore to be understood that the steering arm 554 of the king-pin joint assembly 500 provides an amount of force needed to pivot the steering knuckle 504 relative to the axle beam 502. According to the embodiment of the disclosure illustrated in FIG. 5 and as a non-limiting example, at least a portion of the first end portion 556 of the steering arm 554 is integrally formed as part of the first yoke arm 546 of the yoke portion 532 of the steering knuckle 504. In accordance with an alternative embodiment of the disclosure (not shown) and as a non-limiting example, at least a portion of the first end portion 556 of the steering arm 554 may be integrally connected to at least a portion of the first yoke arm 546 by using one or more welds, one or more mechanical fasteners, one or more adhesives and/or a threaded connection.

Disposed within at least a portion of the first yoke arm king-pin aperture 552 is a first bearing assembly 558 having a first cap 560, a first bearing cup 562 and one or more first rolling elements 564. As illustrated in FIG. 5 of the disclosure and as a non-limiting example, the first bearing cup 562 has a first end 566 and a second end 568. In accordance with the embodiment of the disclosure illustrated in FIG. 5 and as a non-limiting example, at least a portion of the first end 566 of the first bearing cup 562 is in direct contact with at least a portion of the radially outboard end portion 512 of the connector portion 510 of the axle beam 502. The first bearing cup 562 provides a housing for the one or more first rolling elements 564 of the first bearing assembly 558 of the king-pin joint assembly 500. The first bearing cup 562 of the first bearing assembly 558 has a shape that is complementary to the first yoke arm king-pin aperture 552 in the first yoke arm 546 of the steering knuckle 504 of the king-pin joint assembly 500. As a result, it is within the scope of this disclosure and as a non-limiting example that the first bearing cup 562 may be substantially cylindrical in shape.

Extending inward from at least a portion of the first end 566 of the first bearing cup 562 of the first bearing assembly 558 is a hollow interior portion 570 defined by an inner surface 572. As illustrated in FIG. 5 of the disclosure and as a non-limiting example, hollow interior portion 570 of the first bearing cup 562 is of a size and shape to receive and/or retain at least a portion of the first end portion 520 of the king-pin 506 and at least a portion of the one or more first rolling elements 564 of the first bearing assembly 558. It is therefore to be understood that the first bearing cup 562 of the first bearing assembly 558 provides a housing for the one or more first rolling elements 564 of the first bearing assembly 558. As a non-limiting example that the hollow interior portion 570 of the first bearing cup 562 may be substantially cylindrical in shape.

Interposed between at least a portion of the inner surface 572 of the hollow interior portion 570 of the first bearing cup 562 and at least a portion of the outer surface 518 of the first end portion 520 of the king-pin 506 is the one or more first rolling elements 564 of the first bearing assembly 558. The one or more first rolling elements 564 of the first bearing assembly 558 aid in reducing the overall amount of friction between the first yoke arm 546 of the steering knuckle 504, the first bearing cup 562 and the king-pin 506 when in operation thereby improving the overall life and durability of the king-pin joint assembly 500. It is within the scope of this disclosure and as a non-limiting example that the one or more first rolling elements 564 of the first bearing assembly 558 may be one or more bushings, one or more ball bearings and/or one or more needle bearings.

As illustrated in FIG. 5 of the disclosure and as a non-limiting example, the first bearing assembly 558 may further include the use of a first thrust member 574. In accordance with the embodiment of the disclosure illustrated in FIG. 5 and as a non-limiting example, at least a portion of the first thrust member 574 of the first bearing assembly 558 of the king-pin joint assembly 500 is interposed between a first end 576 of the king-pin 506 and the inner surface 572 of a base portion 578 of the first bearing cup 562. The first thrust member 574 aids in reducing the overall amount of friction between the base portion 578 of the first bearing cup 562 and the first end 576 of the king-pin 506 when in operation thereby improving the overall life and durability of the king-pin joint assembly 500. Additionally, the first thrust member 574 aids in supporting at least a portion of the radial loads experienced by the first bearing assembly 558 when in operation thereby further aiding in improving the overall life and durability of the king-pin joint assembly 500. As a non-limiting example, that the first thrust member 574 of the first bearing assembly 558 of the king-pin joint assembly 500 may be substantially a substantially disc-shaped thrust member. It is within the scope of this disclosure and as a non-limiting example that the first thrust member 574 may be a thrust bushing, a thrust bearing and/or a thrust roller bearing.

In accordance with the embodiment of the disclosure illustrated in FIG. 5 and as a non-limiting example, the first bearing assembly 558 of the king-pin joint assembly 500 may further include the use of one or more first sealing members 580. At least a portion of the one or more first sealing members 580 are sealingly engaged with at least a portion of the first bearing cup 562, the first end portion 520 of the king-pin 506 and/or the one or more first rolling elements 564. As illustrated in FIG. 5 of the disclosure and as a non-limiting example, at least a portion of the one or more first sealing members 580 of the first bearing assembly 558 are disposed within the hollow interior portion 570 of the first bearing cup 562. Additionally, as illustrated in FIG. 5 of the disclosure and as a non-limiting example, the one or more first sealing members 580 of the first bearing assembly 558 are interposed between the radially outboard end portion 512 of the connector portion 510 and the one or more first rolling elements 564 of the first bearing assembly 558. The one or more first sealing members 580 of the first bearing assembly 558 aid in preventing the migration of dirt, debris and/or moisture into the first bearing assembly 558 thereby aiding in improving the overall life and durability of the king-pin joint assembly 500. Additionally, the one or more first sealing members 580 aid in preventing the migration of an amount of lubrication fluid (not shown) from within the first bearing assembly 558 when in operation thereby further aiding in improving the overall life and durability of the king-pin joint assembly 500.

Disposed radially outboard from at least a portion of the first bearing cup 562 of the first bearing assembly 558 of the king-pin joint assembly 500 is the first cap 560 having an inner surface 582, an outer surface 584 and a body portion 586. The first cap 560 of the first bearing assembly 558 is of a size and shape to be received and/or retained within at least a portion of the first yoke arm king-pin aperture 552 of the first yoke arm 546 of the steering knuckle 504. It is to be understood that the first cap 560 of the first bearing assembly 558 aids in ensuring that the first bearing cup 562, the king-pin 506, the one or more first rolling elements 564, the one or more first sealing members 580 and/or first thrust member 574 are secured within the first yoke arm king-pin aperture 552 of the first yoke arm 546. It is within the scope of this disclosure and as a non-limiting example that the first cap 560 of the first bearing assembly 558 of the king-pin joint assembly 500 may be substantially disc-shaped. Additionally, it is within the scope of this disclosure and as a non-limiting example that the first cap 560 may be retained within the first yoke arm king-pin aperture 552 of the first yoke arm 546 by using one or more welds, one or more mechanical fasteners, one or more adhesives, a threaded connection and/or a press-fit connection.

According to the embodiment of the disclosure illustrated in FIG. 5 and as a non-limiting example, the first cap 560 of the first bearing assembly 558 may be retained within the first yoke arm king-pin aperture 552 of the first yoke arm 546 by using one or more first retaining members 588. In accordance with the embodiment of the disclosure illustrated in FIG. 5 and as a non-limiting example, at least a portion of the one or more first retaining members 588 are received and/or retained within at least a portion of one or more first yoke arm retaining member grooves 590 circumferentially extending along at least a portion of a surface 553 defining the first yoke arm king-pin aperture 552 of the first yoke arm 546. Additionally, in accordance with the embodiment of the disclosure illustrated in FIG. 5 and as a non-limiting example, at least a portion of the one or more first retaining members 588 are received and/or retained within at least a portion of one or more first cap retaining member grooves 592 circumferentially extending along at least a portion of the body portion 586 of the first cap 560. It is within the scope of this disclosure and as a non-limiting example that the one or more first retaining members 588 may be one or more snap-rings.

As illustrated in FIG. 5 of the disclosure and as a non-limiting example, the first bearing assembly 558 of the king-pin joint assembly 500 may further include the use of a first lubrication member 596. The first lubrication member 596 allows for the introduction of an amount of lubrication fluid (not shown) into the first bearing assembly 558 thereby aiding in improving the overall life and durability of the king-pin joint assembly 500. In accordance with this embodiment of the disclosure and as a non-limiting example, the first cap 560 has a first cap aperture 594 that extends from the inner surface 582 to the outer surface 584 of the first cap 560 of the first bearing assembly 558. The first cap aperture 594 is of a size and shape to receive and/or retain at least a portion of the first lubrication member 596. As a non-limiting example, the first lubrication member 596 of the first bearing assembly 558 may be retained within the first cap aperture 594 of the first cap 560 by using one or more welds, one or more mechanical fasteners, one or more adhesives, a press-fit connection and/or a threaded connection. It is within the scope of this disclosure and as a non-limiting example that the first lubrication member 596 may be a Zerk fitting, a grease nipple, an Alemite fitting or a grease fitting.

Extending outboard from at least a portion of the axially inboard side 544 of the radially inboard end portion 540 of the radially extending portion 536 of the yoke portion 532 of the steering knuckle 504 is a second yoke arm 598 of the steering knuckle 504. As illustrated in FIG. 5 of the disclosure and as a non-limiting example, the second yoke arm 598 of the yoke portion 532 of the steering knuckle 504 has an inner surface 600 and an outer surface 602. A second yoke arm king-pin aperture 604 extends from the inner surface 600 to the outer surface 602 of the first yoke arm 598 of the yoke portion 532 of the steering knuckle 504. The second yoke arm king-pin aperture 604 of the second yoke arm 598 is of a size and shape to receive and/or retain at least a portion of the second end portion 522 of the king-pin 506 of the king-pin joint assembly 500. It is therefore to be understood that at least a portion of the second end portion 522 of the king-pin 506 is disposed within at least a portion of the second yoke arm king-pin aperture 604 of the second yoke arm 598. In accordance with an embodiment of the disclosure illustrated in FIG. 5 and as a non-limiting example, the second yoke arm king-pin aperture 604 of the second yoke arm 598 may be substantially cylindrical in shape.

Interposed between the inner surface 600 of the second yoke arm 598 of the steering knuckle 504 and the radially inboard end portion 514 of the connector portion 510 of the axle beam 502 is a bearing 606. The bearing 606 of the king-pin joint assembly 500 aids in reducing the overall amount of friction between the connector portion 510 and the second yoke arm 598 of the king-pin joint assembly 500 when in operation thereby aiding in increasing the overall life and durability of the king-pin joint assembly 500. Additionally, it is to be understood that the bearing 606 aids in supporting the radial loads experienced by the king-pin join assembly 500 when in operation thereby further aiding in increasing the overall life and durability of the king-pin joint assembly 500. It is within the scope of this disclosure and as a non-limiting example that the bearing 606 of the king-pin joint assembly 500 may be a thrust bearing.

A tie-rod 608 having a first end portion 610 and a second end portion (not shown) extends from an end of the second yoke arm 598 of the steering knuckle 504 opposite the radially extending portion 536 of the steering knuckle 504. The tie-rod 608 is attached to the steering knuckles of the vehicle and facilitates the application of an amount of force onto the steering knuckles needed turn and/or pivot the steering knuckles and the wheel assemblies connected thereto. As illustrated in FIG. 5 of the disclosure and as a non-limiting example, at least a portion of the first end portion 610 of the tie-rod 608 is pivotable connected to at least a portion of the end of the second yoke arm 598, opposite the radially extending portion 536 of the steering knuckle 504, by using one or more mechanical fasteners 612.

Disposed within at least a portion of the second yoke arm king-pin aperture 604 is a second bearing assembly 614 having a second cap 616, a second bearing cup 618 and one or more second rolling elements 620. As illustrated in FIG. 5 of the disclosure and as a non-limiting example, the second bearing cup 618 has a first end 622 and a second end 624. The second bearing cup 618 provides a housing for the one or more second rolling elements 620 of the second bearing assembly 614 of the king-pin joint assembly 500. The second bearing cup 618 of the second bearing assembly 614 has a shape that is complementary to the second yoke arm king-pin aperture 604 in the second yoke arm 598 of the steering knuckle 504 of the king-pin joint assembly 500. As a result, it is within the scope of this disclosure and as a non-limiting example that the second bearing cup 618 may be substantially cylindrical in shape.

Extending inward from at least a portion of the first end 622 of the second bearing cup 618 of the second bearing assembly 614 is a hollow interior portion 626 defined by an inner surface 628. As illustrated in FIG. 5 of the disclosure and as a non-limiting example, second bearing cup 618 is of a size and shape to receive and/or retain at least a portion of the second end portion 522 of the king-pin 506 and at least a portion of the one or more second rolling elements 620 of the second bearing assembly 614. It is therefore to be understood that the second bearing cup 618 of the second bearing assembly 614 provides a housing for the one or more second rolling elements 620 of the second bearing assembly 614. As a non-limiting example that the hollow interior portion 626 of the second bearing cup 618 may be substantially cylindrical in shape.

Interposed between at least a portion of the inner surface 628 of the hollow interior portion 626 of the second bearing cup 618 and at least a portion of the outer surface 518 of the second end portion 522 of the king-pin 506 is the one or more second rolling elements 620 of the second bearing assembly 614. The one or more second rolling elements 620 of the second bearing assembly 614 aid in reducing the overall amount of friction between the second yoke arm 598 of the steering knuckle 504 and the king-pin 506 when in operation thereby improving the overall life and durability of the king-pin joint assembly 500. It is within the scope of this disclosure and as a non-limiting example that the one or more second rolling elements 620 of the second bearing assembly 614 may be one or more ball bearings and/or one or more needle bearings that are either substantially spherical and/or substantially cylindrical in shape.

As illustrated in FIG. 5 of the disclosure and as a non-limiting example, the second bearing assembly 614 may further include the use of a second thrust member 630. In accordance with the embodiment of the disclosure illustrated in FIG. 5 and as a non-limiting example, at least a portion of the second thrust member 630 of the second bearing assembly 614 of the king-pin joint assembly 500 is interposed between a second end 632 of the king-pin 506 and the inner surface 628 of a base portion 634 of the second bearing cup 618. The second thrust member 630 aids in reducing the overall amount of friction between the base portion 634 of the second bearing cup 618 and the second end 632 of the king-pin 506 when in operation thereby improving the overall life and durability of the king-pin joint assembly 500. Additionally, the second thrust member 630 aids in supporting at least a portion of the radial loads experienced by the second bearing assembly 614 when in operation thereby further aiding in improving the overall life and durability of the king-pin joint assembly 500. As a non-limiting example, that the second thrust member 630 of the second bearing assembly 614 of the king-pin joint assembly 500 may be substantially a substantially disc-shaped thrust member. It is within the scope of this disclosure and as a non-limiting example that the second thrust member 630 may be a thrust bushing, a thrust bearing and/or a thrust roller bearing.

In accordance with the embodiment of the disclosure illustrated in FIG. 5 and as a non-limiting example, the second bearing assembly 614 of the king-pin joint assembly 500 may further include the use of one or more second sealing members 636. At least a portion of the one or more second sealing members 636 are sealingly engaged with at least a portion of the second bearing cup 618, the second end portion 522 of the king-pin 506, the one or more second rolling elements 620 and/or the bearing 606. As illustrated in FIG. 5 of the disclosure and as a non-limiting example, at least a portion of the one or more second sealing members 636 of the second bearing assembly 614 are disposed within the hollow interior portion 626 of the second bearing cup 618. Additionally, as illustrated in FIG. 5 of the disclosure and as a non-limiting example, the one or more second sealing members 636 of the second bearing assembly 614 are interposed between the radially inboard end portion 514 of the connector portion 510 and the one or more second rolling elements 620 of the second bearing assembly 614. The one or more second sealing members 636 of the second bearing assembly 614 aid in preventing the migration of dirt, debris and/or moisture into the second bearing assembly 614 thereby aiding in improving the overall life and durability of the king-pin joint assembly 500. Additionally, the one or more second sealing members 636 aid in preventing the migration of an amount of lubrication fluid (not shown) from within the second bearing assembly 614 when in operation thereby further aiding in improving the overall life and durability of the king-pin joint assembly 500.

Disposed radially outboard from at least a portion of the second bearing cup 618 of the second bearing assembly 614 of the king-pin joint assembly 500 is the second cap 616 having an inner surface 638, an outer surface 640 and a body portion 642. The second cap 616 of the second bearing assembly 614 is of a size and shape to be received and/or retained within at least a portion of the second yoke arm king-pin aperture 604 of the second yoke arm 598 of the steering knuckle 504. It is to be understood that the second cap 616 of the second bearing assembly 614 aids in ensuring that the second bearing cup 618, the one or more second rolling elements 620, the king-pin 506, the one or more second sealing members 636 and/or second thrust member 630 are secured within the second yoke arm king-pin aperture 604 of the second yoke arm 598. It is within the scope of this disclosure and as a non-limiting example that the second cap 616 of the second bearing assembly 614 of the king-pin joint assembly 500 may be substantially disc-shaped. Additionally, it is within the scope of this disclosure and as a non-limiting example that the second cap 616 may be retained within the second yoke arm king-pin aperture 604 of the second yoke arm 598 by using one or more welds, one or more mechanical fasteners, one or more adhesives, a threaded connection and/or a press-fit connection.

According to the embodiment of the disclosure illustrated in FIG. 5 and as a non-limiting example, the second cap 616 of the second bearing assembly 614 may be retained within the second yoke arm king-pin aperture 604 of the second yoke arm 598 by using one or more second retaining members 644. In accordance with the embodiment of the disclosure illustrated in FIG. 5 and as a non-limiting example, at least a portion of the one or more second retaining members 644 are received and/or retained within at least a portion of one or more second yoke arm retaining member grooves 646 circumferentially extending along at least a portion of a surface 648 defining the second yoke arm king-pin aperture 694 of the second yoke arm 598. Additionally, in accordance with the embodiment of the disclosure illustrated in FIG. 5 and as a non-limiting example, at least a portion of the one or more second retaining members 644 are received and/or retained within at least a portion of one or more second cap retaining member grooves 650 circumferentially extending along at least a portion of the body portion 642 of the second cap 616. It is within the scope of this disclosure and as a non-limiting example that the one or more second retaining members 644 may be one or more snap-rings.

As illustrated in FIG. 5 of the disclosure and as a non-limiting example, the second bearing assembly 614 of the king-pin joint assembly 500 may further include the use of a second lubrication member 652. The second lubrication member 652 allows for the introduction of an amount of lubrication fluid (not shown) into the second bearing assembly 614 thereby aiding in improving the overall life and durability of the king-pin joint assembly 500. In accordance with this embodiment of the disclosure and as a non-limiting example, the second cap 616 has a second cap aperture 654 that extends from the inner surface 638 to the outer surface 640 of the second cap 616 of the second bearing assembly 614. The second cap aperture 654 is of a size and shape to receive and/or retain at least a portion of the second lubrication member 652. As a non-limiting example, the second lubrication member 652 of the second bearing assembly 614 may be retained within the second cap aperture 654 of the second cap 616 by using one or more welds, one or more mechanical fasteners, one or more adhesives, a press-fit connection and/or a threaded connection. It is within the scope of this disclosure and as a non-limiting example that the second lubrication member 652 may be a Zerk fitting, a grease nipple, an Alemite fitting or a grease fitting.

Extending outboard from at least a portion of the axially outboard side 542 of the radially extending portion 536 of the yoke portion 532 of the steering knuckle 504 is the spindle portion 534 having a first end portion 658, a second end portion 660 and an intermediate portion 661 interposed between the first and second end portions 658 and 660 of the spindle portion 534. The spindle portion 534 provides rotational support for at least a portion of a wheel assembly (not shown). In accordance with the embodiment of the disclosure illustrated in FIG. 5 and as a non-limiting example, the spindle portion 534 of the king-pin joint assembly 500 extends at an angle θ3 relative to the center-line C3 of the king-pin 506.

At least a portion of the first end portion 658 of the spindle portion 534 has a first bearing journal surface 662 having a diameter D1. Additionally, at least a portion of the second end portion 660 of the spindle portion 534 has a second bearing journal surface 664 having a diameter D2. In accordance with the embodiment of the disclosure illustrated in FIG. 5 of the disclosure and as a non-limiting example, the diameter D2 of the second bearing journal surface 664 of the spindle portion 534 is greater than the diameter D1 of the first bearing journal surface 662 of the spindle portion 534.

As illustrated in FIG. 5 of the disclosure and as a non-limiting example, at least a portion of the intermediate portion 661 of the spindle portion 534 includes an increasing diameter portion 666. It is therefore to be understood that the increasing diameter portion 666 of the spindle portion 534 is interposed between the first bearing journal surface 662 and the second bearing journal surface 662 of the spindle portion 534. According to the embodiment of the disclosure illustrated in FIG. 5 and as a non-limiting example, the increasing diameter portion 666 of the intermediate portion 661 of the spindle portion 534 has a diameter D3 that increased from the first bearing journal surface 662 to the second bearing journal surface 664 of the spindle portion 534.

Disposed adjacent to an end of the second bearing journal surface 664, opposite the increasing diameter portion 666 of the spindle portion 534, is an increased diameter portion 668. The increased diameter portion 668 of the second end portion 660 of the spindle portion 534 provides a contact surface for a bearing assembly (not shown) disposed radially outboard from at least a portion of the second bearing journal surface 664 of the spindle portion 534.

It is to be understood that the king-pin joint assembly 500 disclosed herein overcomes the disadvantages of the conventional king-pin joint assembles previously described. As a result, the king-pin joint assembly 500 disclosed herein requires little to no maintenance, part replacements and/or repairs over the life of the king-pin joint assembly 500. This aids in reducing the overall costs associated with the maintenance of fleet vehicles and/or the overall costs associated with the ownership of a fleet of vehicles.

Figure 6:
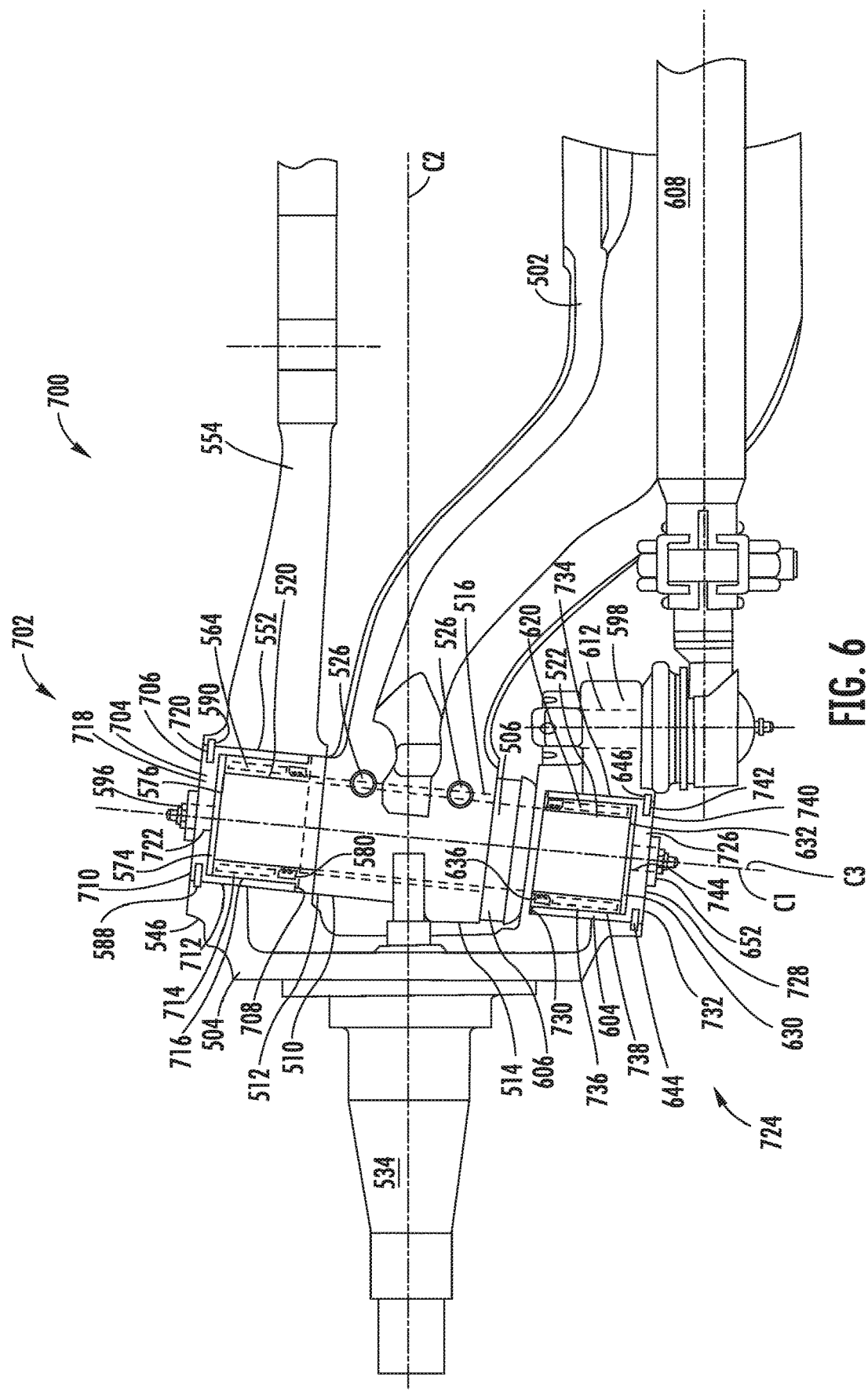
FIG. 6 is a partial cut-away schematic side-view of the king-pin joint assembly illustrated in FIG. 5 according to an alternative embodiment of the disclosure.

FIG. 6 is a partial cut-away schematic side-view of a king-pin joint assembly 700 according to an alternative embodiment of the disclosure. The king-pin joint assembly 700 illustrated in FIG. 6 of the same as the king-pin joint assembly 500 illustrated in FIG. 5, except where noted below. In accordance with the embodiment of the disclosure illustrated in FIG. 6 and as a non-limiting example the king-pin joint assembly 700 does not include the use of the first cap 560 of the first bearing assembly 558 and/or the second cap 616 of the second bearing assembly 614.

As illustrated in FIG. 6 of the disclosure and as a non-limiting example, the king-pin joint assembly 700 includes a first bearing assembly 702 having a first bearing cup 704, the one or more first rolling elements 564, the first thrust member 574 and/or the one or more first sealing members 580. In accordance with the embodiment of the disclosure illustrated in FIG. 6 and as a non-limiting example, the first bearing cup 704 of the first bearing assembly 702 has an outer surface 706, a first end 708, a second end 710 and a body portion 712. In accordance with the embodiment of the disclosure illustrated in FIG. 6 and as a non-limiting example, at least a portion of the first end 708 of the first bearing cup 704 is in direct contact with at least a portion of the radially outboard end portion 512 of the connector portion 510 of the axle beam 502. The first bearing cup 704 provides a housing for the one or more first rolling elements 564 of the first bearing assembly 702 of the king-pin joint assembly 700. The first bearing cup 704 of the first bearing assembly 702 has a shape that is complementary to the first yoke arm king-pin aperture 552 in the first yoke arm 546 of the steering knuckle 504 of the king-pin joint assembly 700. As a result, it is within the scope of this disclosure and as a non-limiting example that the first bearing cup 704 may be substantially cylindrical in shape.

Extending inward from at least a portion of the first end 708 of the first bearing cup 704 of the first bearing assembly 702 is a hollow interior portion 714 defined by an inner surface 716. As illustrated in FIG. 6 of the disclosure and as a non-limiting example, hollow interior portion 714 of the first bearing cup 704 is of a size and shape to receive and/or retain at least a portion of the first end portion 520 of the king-pin 506 and at least a portion of the one or more first rolling elements 564 of the first bearing assembly 702. It is therefore to be understood that the first bearing 702 of the first bearing assembly 702 provides a housing for the one or more first rolling elements 564 of the first bearing assembly 702. As a non-limiting example, the hollow interior portion 714 of the first bearing cup 704 may be substantially cylindrical in shape.

In accordance with the embodiment of the disclosure illustrated in FIG. 6 and as a non-limiting example, at least a portion of the one or more first rolling elements 564 of the first bearing assembly 702 are interposed between the inner surface 716 of the first bearing cup 704 and the first end portion 520 of the king-pin 506 of the first bearing assembly 702. The one or more first rolling elements 564 of the first bearing assembly 702 aid in reducing the overall amount of friction between the first yoke arm 546 of the steering knuckle 504, the first bearing cup 704 and the king-pin 506 when in operation thereby improving the overall life and durability of the king-pin joint assembly 700.

According to the embodiment of the disclosure where the first bearing assembly 702 includes the first thrust member 574, at least a portion of the first thrust member 574 is interposed between the first end 576 of the king-pin 506 and the inner surface 572 of a base portion 718 of the first bearing cup 704 of the first bearing assembly 702 of the king-pin joint assembly 700. The first thrust member 574 aids in reducing the overall amount of friction between the base portion 718 of the first bearing cup 704 and the first end 576 of the king-pin 506 when in operation thereby improving the overall life and durability of the king-pin joint assembly 700. Additionally, the first thrust member 574 aids in supporting at least a portion of the radial loads experienced by the first bearing assembly 702 when in operation thereby further aiding in improving the overall life and durability of the king-pin joint assembly 700.

As illustrated in FIG. 6 of the disclosure and according to the embodiment of the disclosure where the first bearing assembly 702 includes the one or more first sealing members 580, the one or more first sealing members 580 aid in sealing the first bearing assembly 702. At least a portion of the one or more first sealing members 580 are sealingly engaged with at least a portion of the first bearing cup 704, the first end portion 520 of the king-pin 506 and/or the one or more first rolling elements 564. As illustrated in FIG. 6 of the disclosure and as a non-limiting example, at least a portion of the one or more first sealing members 580 of the first bearing assembly 702 are disposed within the hollow interior portion 714 of the first bearing cup 704. Additionally, as illustrated in FIG. 6 of the disclosure and as a non-limiting example, at least a portion of the one or more first sealing members 580 of the first bearing assembly 702 are interposed between the radially outboard end portion 512 of the connector portion 510 and the one or more first rolling elements 564 of the first bearing assembly 702. The one or more first sealing members 580 of the first bearing assembly 702 aid in preventing the migration of dirt, debris and/or moisture into the first bearing assembly 702 thereby aiding in improving the overall life and durability of the king-pin joint assembly 700. Additionally, the one or more first sealing members 580 aid in preventing the migration of an amount of lubrication fluid (not shown) from within the first bearing assembly 702 when in operation thereby further aiding in improving the overall life and durability of the king-pin joint assembly 700.

At least a portion of the first bearing cup 704 of the first bearing assembly 702 is retained within at least a portion of the first yoke arm king-pin aperture 552 of the first yoke arm 546. It is within the scope of this disclosure and as a non-limiting example that the first bearing cup 704 may be retained within the first yoke arm king-pin aperture 552 by using one or more welds, one or more mechanical fasteners, one or more adhesives, a threaded connection and/or a press-fir connection.

In accordance with the embodiment of the disclosure illustrated in FIG. 6 and as a non-limiting example, at least a portion of the first bearing cup 704 of the first bearing assembly 702 may be retained within at least a portion of the first yoke arm king-pin aperture 552 of the first yoke arm 546 by using the one or more first retaining members 588. In accordance with the embodiment of the disclosure illustrated in FIG. 6 and as a non-limiting example, at least a portion of the one or more first retaining members 588 are received and/or retained within at least a portion of the one or more first yoke arm retaining member grooves 590. Additionally, in accordance with the embodiment of the disclosure illustrated in FIG. 6 and as a non-limiting example, at least a portion of the one or more first retaining members 588 are received and/or retained within at least a portion of one or more first cap retaining member grooves 720 circumferentially extending along at least a portion of the outer surface 706 of the body portion 712 of the first bearing cup 704.

According to the embodiment of the disclosure illustrated in FIG. 6 and as a non-limiting example, the first bearing assembly 702 of the king-pin joint assembly 700 may further include the use of the first lubrication member 596. The first lubrication member 596 allows for the introduction of an amount of lubrication fluid (not shown) into the first bearing assembly 702 thereby aiding in improving the overall life and durability of the king-pin joint assembly 700. In accordance with this embodiment of the disclosure and as a non-limiting example, the first bearing cup 704 has a first bearing cup aperture 722 that extends from the second end 710 to the inner surface 716 of the base portion 718 of the first bearing cup 704 of the first bearing assembly 702. The first bearing cup aperture 722 is of a size and shape to receive and/or retain at least a portion of the first lubrication member 596. As a non-limiting example, the first lubrication member 596 of the first bearing assembly 702 may be retained within the first bearing cup aperture 722 of the first bearing cup 704 by using one or more welds, one or more mechanical fasteners, one or more adhesives, a press-fit connection and/or a threaded connection.

As illustrated in FIG. 6 of the disclosure and as a non-limiting example, the king-pin joint assembly 700 includes a second bearing assembly 724 having a second bearing cup 726, the one or more second rolling elements 620, the second thrust member 630 and/or the one or more second sealing members 636. In accordance with the embodiment of the disclosure illustrated in FIG. 6 and as a non-limiting example, the second bearing cup 726 of the second bearing assembly 724 has an outer surface 728, a first end 730, a second end 732 and a body portion 734. The second bearing cup 726 provides a housing for the one or more second rolling elements 620 of the second bearing assembly 724 of the king-pin joint assembly 700. The second bearing cup 726 of the second bearing assembly 724 has a shape that is complementary to the second yoke arm king-pin aperture 604 in the second yoke arm 598 of the steering knuckle 504 of the king-pin joint assembly 700. As a result, it is within the scope of this disclosure and as a non-limiting example that the second bearing cup 726 may be substantially cylindrical in shape.

Extending inward from at least a portion of the first end 730 of the second bearing cup 726 of the second bearing assembly 724 is a hollow interior portion 736 defined by an inner surface 738. As illustrated in FIG. 6 of the disclosure and as a non-limiting example, hollow interior portion 736 of the second bearing cup 726 is of a size and shape to receive and/or retain at least a portion of the second end portion 522 of the king-pin 506 and at least a portion of the one or more second rolling elements 620 of the second bearing assembly 724. It is therefore to be understood that the second bearing cup 726 of the second bearing assembly 724 provides a housing for the one or more second rolling elements 620 of the second bearing assembly 724. As a non-limiting example, the hollow interior portion 738 of the second bearing cup 726 may be substantially cylindrical in shape.

In accordance with the embodiment of the disclosure illustrated in FIG. 6 and as a non-limiting example, at least a portion of the one or more second rolling elements 620 of the second bearing assembly 724 are interposed between the inner surface 738 of the second bearing cup 726 and the second end portion 522 of the king-pin 506 of the second bearing assembly 724. The one or more second rolling elements 620 of the second bearing assembly 724 aid in reducing the overall amount of friction between the second yoke arm 598 of the steering knuckle 504, the second bearing cup 726 and the king-pin 506 when in operation thereby improving the overall life and durability of the king-pin joint assembly 700.

According to the embodiment of the disclosure where the second bearing assembly 724 includes the second thrust member 630, at least a portion of the second thrust member 630 is interposed between the second end 632 of the king-pin 506 and the inner surface 738 of a base portion 740 of the second bearing cup 726 of the second bearing assembly 724 of the king-pin joint assembly 700. The second thrust member 630 aids in reducing the overall amount of friction between the base portion 740 of the second bearing cup 726 and the second end 632 of the king-pin 506 when in operation thereby improving the overall life and durability of the king-pin joint assembly 700. Additionally, the second thrust member 630 aids in supporting at least a portion of the radial loads experienced by the second bearing assembly 724 when in operation thereby further aiding in improving the overall life and durability of the king-pin joint assembly 700.

As illustrated in FIG. 6 of the disclosure and according to the embodiment of the disclosure where the second bearing assembly 724 includes the one or more second sealing members 636, the one or more second sealing members 636 aid in sealing the second bearing assembly 724. At least a portion of the one or more second sealing members 636 are sealingly engaged with at least a portion of the second bearing cup 726, the second end portion 522 of the king-pin 506 and/or the one or more second rolling elements 620. As illustrated in FIG. 6 of the disclosure and as a non-limiting example, at least a portion of the one or more second sealing members 636 of the second bearing assembly 724 are disposed within the hollow interior portion 736 of the second bearing cup 726. Additionally, as illustrated in FIG. 6 of the disclosure and as a non-limiting example, at least a portion of the one or more second sealing members 636 of the second bearing assembly 724 are interposed between the radially inboard end portion 514 of the connector portion 510 and the one or more second rolling elements 620 of the second bearing assembly 724. The one or more second sealing members 620 of the second bearing assembly 724 aid in preventing the migration of dirt, debris and/or moisture into the second bearing assembly 724 thereby aiding in improving the overall life and durability of the king-pin joint assembly 700. Additionally, the one or more second sealing members 636 aid in preventing the migration of an amount of lubrication fluid (not shown) from within the second bearing assembly 724 when in operation thereby further aiding in improving the overall life and durability of the king-pin joint assembly 700.

At least a portion of the second bearing cup 726 of the second bearing assembly 724 is retained within at least a portion of the second yoke arm king-pin aperture 604 of the second yoke arm 598. It is within the scope of this disclosure and as a non-limiting example that the second bearing cup 726 may be retained within the second yoke arm king-pin aperture 604 by using one or more welds, one or more mechanical fasteners, one or more adhesives, a threaded connection and/or a press-fir connection.

In accordance with the embodiment of the disclosure illustrated in FIG. 6 and as a non-limiting example, at least a portion of the second bearing cup 726 of the second bearing assembly 724 may be retained within at least a portion of the second yoke arm king-pin aperture 604 of the second yoke arm 598 by using the one or more second retaining members 644. In accordance with the embodiment of the disclosure illustrated in FIG. 6 and as a non-limiting example, at least a portion of the one or more second retaining members 644 are received and/or retained within at least a portion of the one or more second yoke arm retaining member grooves 646. Additionally, in accordance with the embodiment of the disclosure illustrated in FIG. 6 and as a non-limiting example, at least a portion of the one or more second retaining members 644 are received and/or retained within at least a portion of one or more second cap retaining member grooves 742 circumferentially extending along at least a portion of the outer surface 728 of the body portion 734 of the second bearing cup 726.

According to the embodiment of the disclosure illustrated in FIG. 6 and as a non-limiting example, the second bearing assembly 724 of the king-pin joint assembly 700 may further include the use of the second lubrication member 652. The second lubrication member 652 allows for the introduction of an amount of lubrication fluid (not shown) into the second bearing assembly 724 thereby aiding in improving the overall life and durability of the king-pin joint assembly 700. In accordance with this embodiment of the disclosure and as a non-limiting example, the second bearing cup 726 has a second bearing cup aperture 744 that extends from the second end 732 to the inner surface 738 of the base portion 740 of the second bearing cup 726 of the second bearing assembly 724. The second bearing cup aperture 744 is of a size and shape to receive and/or retain at least a portion of the second lubrication member 652. As a non-limiting example, the second lubrication member 652 of the second bearing assembly 724 may be retained within the second bearing cup aperture 744 of the second bearing cup 726 by using one or more welds, one or more mechanical fasteners, one or more adhesives, a press-fit connection and/or a threaded connection.

It is to be understood that the king-pin joint assembly 700 disclosed herein overcomes the disadvantages of the conventional king-pin joint assemblies previously described. As a result, the king-pin joint assembly 700 disclosed herein requires little to no maintenance, part replacements and/or repairs over the life of the king-pin joint assembly 700. This aids in reducing the overall costs associated with the maintenance of fleet vehicles and/or the overall costs associated with the ownership of a fleet of vehicles.

FIGS. 7 and 7A are a schematic side-view of a king-pin joint assembly 800 according to another embodiment of the disclosure. The king-pin joint assembly 800 illustrated in FIGS. 7 and 7A is the same as the king-pin joint assemblies 500 and 700 illustrated in FIGS. 5 and 6, except where specifically noted below. As illustrated in FIGS. 7 and 7A of the disclosure the king-pin joint assembly 800 includes a king-pin 802 that provides a rigid and/or pivotable connection between a steering knuckle 804 and the axle beam 502 of the king-pin joint assembly 800. It is therefore to be understood that the king-pin 802 of the king-pin joint assembly 800 provides the main pivot point for the steering mechanism of the vehicle (not shown).

As best seen in FIG. 7 of the disclosure and as a non-limiting example, the king-pin 802 has an outer surface 805, a first end portion 806 and a second end portion 808 and an intermediate portion 810 interposed between the first and second end portions 806 and 808 of the king-pin 802. At least a portion of the intermediate portion 810 of the king-pin 802 is received and/or retained within at least a portion of the axle beam king-pin receiving aperture 516 in the connector portion 510 of the axle beam 502 of the king-pin joint assembly 800. When the king-pin joint assembly 800 is assembled, the king-pin 802 will have a center-line C4 that is substantially similar to the center-line C1 of the axle beam king-pin receiving aperture 516. As a result, when the king-pin joint assembly 800 is assembled, the king-pin 802 will be disposed at an angle θ4 relative to a center-line C5 of the steering knuckle 804. It is within the scope of this disclosure and as a non-limiting example that the angle θ4 of the king-pin 802 may be substantially equal to the angle θ1 of the axle beam king-pin receiving aperture 516 of the king-pin joint assembly 800.

In order to retain at least a portion of the king-pin 802 within the axle beam king-pin receiving aperture 516 of the connector portion 510 of the axle beam 502, one or more draw keys 812 are used. As best seen in FIG. 7 of the disclosure and as a non-limiting example, the one or more draw keys 812 of the king-pin joint assembly 800 extend substantially transverse to the center-line C1 of the axle beam king-pin receiving aperture 516 and the center-line C4 of the king-pin 802. According to the embodiment of the disclosure illustrated in FIG. 7 and as a non-limiting example the one or more draw keys 812 of the king-ping joint assembly 800 are substantially cylindrical in shape having one or more substantially flat portions 816 extending along at least a portion of an outer surface 814 of a body portion 818 of the one or more draw keys 812. In accordance with the embodiment of the disclosure illustrated in FIG. 7 and as a non-limiting example, the one or more substantially flat portions 816 of the one or more draw keys 812 extend substantially transverse to the center-line C4 of the king-pin 802.

At least a portion of the one or more draw keys 812 of the king-pin joint assembly 800 are received and/or retained within at least a portion of the one or more connector portion draw key apertures 530 within the connector portion 510 of the axle beam 502. As best seen in FIG. 7 of the disclosure and as a non-limiting example, at least a portion of an arcuate portion 820 of the one or more draw keys 812 is disposed within at least a portion of the one or more connector portion draw key apertures 530 in the connector portion 510 of the axle beam 502. It is therefore to be understood that the arcuate portion 820 of the one or more draw keys 812 may have a shape that is complementary to the shape of the one or more connector portion draw key apertures 530 in the connector portion 510 of the axle beam 502.

Additionally, as illustrated in FIG. 7 of the disclosure and as a non-limiting example, at least a portion of the substantially flat portions 816 of the one or more draw keys 812 are received and/or retained within at least a portion of one or more king-pin draw key grooves 832. As best seen in FIG. 7 of the disclosure and as a non-limiting example the one or more king-pin draw key grooves 832 extend along at least a portion of the outer surface 805 of the intermediate portion 810 of the king-pin 802. The one or more king-pin draw key grooves 832 in the outer surface 805 of the king-pin 802 extend substantially transverse to the center-line C3 of the king-pin 802 and has a substantially uniform depth. Additionally, the one or more king-pin draw key grooves 832 in the outer surface 805 of the king-pin 802 are aligned with the one or more connector portion draw key apertures 530 in the connector portion 510 of the axle beam 502. It is within the scope of this disclosure and as a non-limiting example that the one or more king-pin draw key grooves 832 have a shape that is complementary to the one or more substantially flat portions 816 of the one or more draw keys 812. As a result, the one or more king-pin draw key grooves 832 in the king-pin 802 may have a substantially flat bottom surface 834.

Extending from at least a portion of the outer surface 805 of the second end portion 808 of the king-pin 802 of the king-pin joint assembly 800 is an increased diameter portion 836. The increased diameter portion 836 of the second end portion 808 of the king-pin 802 aids in ensuring that the king-pin 802 does not work its way out of the king-pin joint assembly 800 when in operation.

Disposed axially outboard from at least a portion of the axle beam 502 is the steering knuckle 804 of the king-pin joint assembly 800. As best seen in FIG. 7 of the disclosure and as a non-limiting example, the steering knuckle 804 has a yoke portion 838 the spindle portion 534 previously discussed. The yoke portion 838 of the steering knuckle 804 of the king-pin joint assembly 800 has a radially extending portion 840 having a radially outboard end portion 842, a radially inboard end portion 844, an axially outboard side 846 and an axially inboard side 848. The yoke portion 838 provides a rigid and/or pivotable connection between the steering knuckle 804, the king-pin 802 and the axle beam 502 of the king-pin joint assembly 800.

Extending outboard from at least a portion of the axially inboard side 848 of the radially outboard end portion 842 of the radially extending portion 840 of the yoke portion 838 of the steering knuckle 804 is a first yoke arm 850 of the steering knuckle 804. As best seen in FIG. 7 of the disclosure and as a non-limiting example, the first yoke arm 850 of the yoke portion 838 of the steering knuckle 804 has an inner surface 852 and an outer surface 854. A first yoke arm king-pin aperture 856 extends from the inner surface 852 to the outer surface 854 of the first yoke arm 850 of the yoke portion 838 of the steering knuckle 804. The first yoke arm king-pin aperture 856 of the first yoke arm 838 is of a size and shape to receive and/or retain at least a portion of the first end portion 806 of the king-pin 802 of the king-pin joint assembly 800. It is therefore to be understood that at least a portion of the first end portion 806 of the king-pin 802 is disposed within at least a portion of the first yoke arm king-pin aperture 856 of the first yoke arm 850. In accordance with an embodiment of the disclosure illustrated in FIG. 7 and as a non-limiting example, the first yoke arm king-pin aperture 856 of the first yoke arm 850 may be substantially cylindrical in shape.

As best seen in FIG. 7 of the disclosure and as a non-limiting example, at least a portion of the first end portion 556 of the steering arm 554 extends from at least a portion of an end of the first yoke arm 850 of the steering knuckle 804 opposite the radially extending portion 840 of the steering knuckle 804. According to the embodiment of the disclosure illustrated in FIG. 7 and as a non-limiting example, at least a portion of the first end portion 556 of the steering arm 554 is integrally formed as part of the first yoke arm 850 of the yoke portion 838 of the steering knuckle 804. In accordance with an alternative embodiment of the disclosure (not shown) and as a non-limiting example, at least a portion of the first end portion 556 of the steering arm 554 may be integrally connected to at least a portion of the first yoke arm 850 by using one or more welds, one or more mechanical fasteners, one or more adhesives and/or a threaded connection.

Disposed within at least a portion of the first yoke arm king-pin aperture 856 is a first bearing assembly 858 having a first cap 860 and one or more first bushing elements 862. In accordance with the embodiment of the disclosure illustrated in FIG. 7 and as a non-limiting example, at least a portion of the one or more first bushing elements 862 are interposed between the outer surface 805 of the first end portion 806 of the king-pin 802 and a surface 868 defining the first yoke arm king-pin aperture 856. As best seen in FIG. 7 of the disclosure and as a non-limiting example, the one or more first bushing elements 862 of the first bearing assembly 858 has a first end 864 and a second end 866. Extending from the first end 864 to the second end 866 of the one or more first bushing elements 862 is a hollow interior portion 870. The hollow interior portion 870 of the one or more first bushing elements 862 is of a size and shape to receive and/or retain at least a portion of the first end portion 806 of the king-pin 802. It is to be understood that the one or more first bushing elements 862 of the first bearing assembly 858 of the king-pin joint assembly 800 aid in reducing the overall amount of friction between the king-pin 802 and the first yoke arm 850 thereby improving the overall life and durability of the king-pin joint assembly 800. As a non-limiting example, the one or more first bushing elements 862 may be substantially cylindrical in shape.

At least a portion of the first cap 860 is disposed radially outboard from at least a portion of the first end portion 806 of the king-pin 802 and the one or more first bushing elements 862 of the first bearing assembly 858 of the king-pin joint assembly 800. As best seen in FIG. 7 of the disclosure and as a non-limiting example, the first cap 860 has an inner surface 872, an outer surface 874 and a body portion 876. The first cap 860 of the first bearing assembly 858 is of a size and shape to be received and/or retained within at least a portion of the first yoke arm king-pin aperture 856 of the first yoke arm 850 of the steering knuckle 804. It is to be understood that the first cap 860 of the first bearing assembly 858 aids in ensuring that the one or more first bushing elements 862, the king-pin 802 and/or the first thrust member 574 are secured within the first yoke arm king-pin aperture 856 of the first yoke arm 850. It is within the scope of this disclosure and as a non-limiting example that the first cap 860 of the first bearing assembly 858 of the king-pin joint assembly 800 may be substantially disc-shaped. Additionally, it is within the scope of this disclosure and as a non-limiting example that the first cap 860 may be retained within the first yoke arm king-pin aperture 856 of the first yoke arm 850 by using one or more welds, one or more mechanical fasteners, one or more adhesives, a threaded connection and/or a press-fit connection. As a non-limiting example, the one or more mechanical fasteners may be one or more snap-rings.

In accordance with the embodiment of the disclosure illustrated in FIG. 7 and as a non-limiting example, at least a portion of the first cap 860 may be received and/or retained within a first cap receiving portion 878 in the surface 868 defining the first yoke arm king-pin aperture 856. As best seen in FIG. 7 of the disclosure, the first cap receiving portion 878 circumferentially extends along at least a portion of a first end portion 880 of the surface 878 defining the first yoke arm king-pin aperture 856 of the first yok arm 850. It is therefore to be understood that the first cap receiving portion 878 in the first yoke arm king-pin aperture 856 has a size and shape that is complementary to the first cap 860 so as to receive and/or retain at least a portion of the first cap 860 of the first bearing assembly 858 of the king-pin joint assembly 800. According to an embodiment of the disclosure and as a non-limiting example, the first cap receiving portion 878 of the first yoke arm king-pin aperture 856 has an outermost diameter that is larger than a diameter of an intermediate portion 882 of the first yoke arm king-pin aperture 856.

It is within the scope of this disclosure and as a non-limiting example that the first bearing assembly 858 of the king-pin joint assembly 800 may further include the use of the first thrust member 574. As best seen in FIG. 7 of the disclosure and as a non-limiting example, at least a portion of the first thrust member 574 is interposed between a first end 884 of the king-pin 802 and the inner surface 872 of the first cap 860. The first thrust member 574 of the first bearing assembly 858 aids in reducing the overall amount of friction between the first cap 860 and the first end 884 of the king-pin 802 when in operation thereby improving the overall life and durability of the king-pin joint assembly 800. Additionally, the first thrust member 574 aids in supporting at least a portion of the radial loads experienced by the first bearing assembly 858 when in operation thereby further aiding in improving the overall life and durability of the king-pin joint assembly 800.

In accordance with the embodiment of the disclosure illustrated in FIG. 7 and as a non-limiting example, at least a portion of the first thrust member 574 may be disposed within a first thrust member receiving portion 886 in the inner surface 872 of the first cap 860. The first thrust member receiving portion 886 extends radially outward from at least a portion of the inner surface 872 of the first cap 860. The first thrust member receiving portion 886 of the first cap 860 aids in ensuring that the first thrust member 574 is retained in its ideal operating position between the king-pin 802 and the first cap 860 at all times when in operation. This aids in improving the overall life and durability of the king-pin joint assembly 800.

Disposed radially outboard from the first thrust member receiving portion 886 of the first cap 860 is a lubricant receiving portion 888. As best seen in FIG. 7 of the disclosure and as a non-limiting example, the lubricant receiving portion 888 extends radially outboard from at least a portion of the first thrust member receiving portion 886 of the first cap 860. The lubricant receiving portion 888 of the first cap 860 provides a space for the introduction of an amount of lubricant (not shown) into the first bearing assembly 858 and/or aids in promoting the flow of an amount of lubrication fluid (not shown) within the first bearing assembly 858. This further aids in improving the overall life and durability of the king-pin joint assembly 800.

In accordance with the embodiment of the disclosure illustrated in FIG. 7 and as a non-limiting example, the first bearing assembly 858 of the king-pin joint assembly 800 may further include the use of the first lubrication member 596. The first lubrication member 596 allows for the introduction of an amount of lubrication fluid (not shown) into the first bearing assembly 858 thereby aiding in improving the overall life and durability of the king-pin joint assembly 800. As best seen in FIG. 7 of the disclosure and as a non-limiting example, the first cap 860 has a first cap aperture 890 that extends from the inner surface 872 to the outer surface 874 of the first cap 860. The first cap aperture 890 is of a size and shape to receive and/or retain at least a portion of the first lubrication member 596. As a non-limiting example, the first lubrication member 596 of the first bearing assembly 858 may be retained within the first cap aperture 890 of the first cap 860 by using one or more welds, one or more mechanical fasteners, one or more adhesives, a press-fit connection and/or a threaded connection.

According to a further embodiment of the disclosure and as a non-limiting example, the first cap 860 may further include a radially extending portion 892 that extends radially outboard from at least a portion of the outer surface 874 of the first cap 860. In accordance with this embodiment of the disclosure, the first cap aperture 890 extends through the radially extending portion 892. The radially extending portion 892 of the first cap 860 provides a housing for at least a portion of the first lubrication member 596 of the first bearing assembly 858. As a result, it is to be understood that at least a portion of the first lubrication member 596 is received and/or retained within at least a portion of the first cap aperture 890 in the radially extending portion 892 of the first cap 860.

As best seen in FIG. 7 of the disclosure and as a non-limiting example, the first bearing assembly 858 may further include one or more first sealing members 894. The one or more first sealing members 894 are interposed between the radially outboard end portion 512 of the connector portion 510 of the axle beam 502 and the one or more first bushing elements 862 of the first bearing assembly 858. At least a portion of the one or more first sealing members 894 are sealingly engaged with at least a portion of the first end portion 806 of the king-pin 802, the one or more first bushing elements, the first yoke arm 850 and/or the first yoke arm king-pin aperture 856. The one or more first sealing members 894 of the first bearing assembly 858 aid in preventing the migration of dirt, debris and/or moisture into the first bearing assembly 858 thereby aiding in improving the overall life and durability of the king-pin joint assembly 800. Additionally, the one or more first sealing members 894 aid in preventing the migration of an amount of lubrication fluid (not shown) from within the first bearing assembly 858 when in operation thereby further aiding in improving the overall life and durability of the king-pin joint assembly 800.

Circumferentially extending along at least a portion of a second end portion 896 of the first yoke arm king-pin aperture 856 is a sealing member receiving portion 898. The sealing member receiving portion 898 of the first yoke arm king-pin aperture 856 is of a size and shape to receive and/or retain at least a portion of the one or more first sealing members 896 of the first bearing assembly 858. Additionally, the sealing member receiving portion 898 of the first yoke arm king-pin aperture 856 provides one or more surfaces for the one or more first sealing members 894 to sealingly engage. In accordance with the embodiment of the disclosure illustrated in FIG. 7 and as a non-limiting example, a first end portion 900 of the sealing member receiving portion 898 has a decreasing diameter portion 902 and a second end portion 904 of the sealing member receiving portion 898 has a substantially cylindrical portion 906.

In accordance with embodiment of the disclosure illustrated in FIG. 7A and as a non-limiting example, the one or more first sealing members 894 of the first bearing assembly 858 has a first end portion 908, a second end portion 910, an inner surface 912 and an outer surface 914. As best seen in FIG. 7A of the disclosure and as a non-limiting example, at least a portion of the first end portion 908 of the one or more first sealing members 894 is sealingly engaged with and disposed within at least a portion of the substantially cylindrical portion 906 of the second end portion 904 of the sealing member receiving portion 898 of the first yoke arm king-pin aperture 856. Additionally, as best seen in FIG. 7A of the disclosure and as a non-limiting example, at least a portion of the second end portion 910 of the one or more first sealing members 894 is sealingly engaged with at least a portion of the outer surface 805 of the first end portion 806 of the king-pin 802.

As best seen in FIG. 7A of the disclosure and as a non-limiting example, the first end portion 904 of the one or more first sealing members 894 has a first radially extending portion 916, the second end portion 910 has a second radially extending portion 918 and the intermediate portion 912 has an arcuate portion 920. It is within the scope of this disclosure and as a non-limiting example that the arcuate portion 920 of the one or more first sealing members 894 may be substantially concave in shape. One end of the arcuate portion 920 of the one or more first sealing members 894 is connected to the first radially extending portion 916 and an end of the arcuate portion 920, opposite the first radially extending portion 916, is connected to at least a portion of the second radially extending portion 918 of the one or more first sealing members 894. As illustrated in FIG. 7A of the disclosure and as a non-limiting example, at least a portion of the second radially extending portion 916 of the one or more first sealing members 894 is disposed radially outboard from at least a portion of the second radially extending portion 918 of the one or more first sealing members 894. Additionally, as illustrated in FIGS. 7 and 7A and as a non-limiting example, the first radially extending portion 916 of the one or more first sealing members 894 have an inner diameter ID1 that is greater than an inner diameter ID2 of the second radially extending portion 918 of the one or more first sealing members 894.

In order to ensure that the second end portion 910 and the second radially extending portion 918 is sealingly engaged with at least a portion of the outer surface 805 of the first end portion 806 of the king-pin 802, a seal retaining member 922 may be used. As best seen in FIG. 7A of the disclosure and as a non-limiting example, at least a portion of the seal retaining member 922 is received and/or retained within a seal retaining member groove 924 circumferentially extending along at least a portion of the outer surface 914 of the second radially extending portion 918 of the one or more first sealing members 894.

It is within the scope of this disclosure and as a non-limiting example that the one or more first sealing members 894 of the first bearing assembly 858 may be a purgeable. As a result, it is within the scope of this disclosure and as a non-limiting example that the one or more first sealing members 894 may be able to vent any excess pressure that is generated within the first bearing assembly 858 when in operation. Additionally, it is within the scope of this disclosure and as a non-limiting example that the one or more first sealing members 894 may be able to expel an excess amount of lubrication fluid (not shown) from within the first bearing assembly 858. This will aid in improving the overall life and durability of the king-pin joint assembly 800.

Extending outboard from at least a portion of the axially inboard side 848 of the radially inboard end portion 844 of the radially extending portion 840 of the yoke portion 838 of the steering knuckle 804 is a second yoke arm 926. As best seen in FIG. 7 of the disclosure and as a non-limiting example, the second yoke arm 926 of the yoke portion 838 of the steering knuckle 804 has an inner surface 928 and an outer surface 930. A second yoke arm king-pin aperture 932 extends from the inner surface 928 to the outer surface 930 of the second yoke arm 926 of the yoke portion 838 of the steering knuckle 804. The second yoke arm king-pin aperture 932 of the second yoke arm 926 is of a size and shape to receive and/or retain at least a portion of the second end portion 808 of the king-pin 802 of the king-pin joint assembly 800. It is therefore to be understood that at least a portion of the second end portion 808 of the king-pin 802 is disposed within at least a portion of the second yoke arm king-pin aperture 932 of the second yoke arm 926. In accordance with an embodiment of the disclosure illustrated in FIG. 7 and as a non-limiting example, the second yoke arm king-pin aperture 932 of the second yoke arm 926 may be substantially cylindrical in shape.

Circumferentially extending along at least a portion of a first end portion 935 of a surface 934 defining the second yoke arm king-pin aperture 932 is a receiving portion 936. As best seen in FIG. 7 of the disclosure and as a non-limiting example, at least a portion of the increased diameter portion 836 of the second end portion 808 of the king-pin 802 is received and/or retained with in at least a portion of the receiving portion 936 of the second yoke arm king-pin aperture 932. It is therefore within the scope of this disclosure and as a non-limiting example, that the receiving portion 936 of the second yoke arm king-pin aperture 932 may have a shape that is complementary to the shape of the increased diameter portion 836 of the second end portion 808 of the king-pin 802.

Disposed within at least a portion of the second yoke arm king-pin aperture 932 is a second bearing assembly 938 having a second cap 940 and one or more second bushing elements 942. In accordance with the embodiment of the disclosure illustrated in FIG. 7 and as a non-limiting example, at least a portion of the one or more second bushing elements 942 are interposed between the outer surface 805 of the second end portion 808 of the king-pin 802 and a surface 934 defining the second yoke arm king-pin aperture 932. As best seen in FIG. 7 of the disclosure and as a non-limiting example, the one or more second bushing elements 942 of the second bearing assembly 938 has a first end 944 and a second end 946. Extending from the first end 944 to the second end 946 of the one or more second bushing elements 942 is a hollow interior portion 948. The hollow interior portion 948 of the one or more second bushing elements 942 is of a size and shape to receive and/or retain at least a portion of the second end portion 808 of the king-pin 802. It is to be understood that the one or more second bushing elements 942 of the second bearing assembly 938 of the king-pin joint assembly 800 aid in reducing the overall amount of friction between the king-pin 802 and the second yoke arm 926 thereby improving the overall life and durability of the king-pin joint assembly 800. As a non-limiting example, the one or more second bushing elements 942 may be substantially cylindrical in shape.

At least a portion of the first cap 940 is disposed radially outboard from at least a portion of the second end portion 808 of the king-pin 802 and the one or more second bushing elements 942 of the second bearing assembly 938 of the king-pin joint assembly 800. As best seen in FIG. 7 of the disclosure and as a non-limiting example, the second cap 940 has an inner surface 950, an outer surface 952 and a body portion 954. The second cap 940 of the second bearing assembly 938 is of a size and shape to be received and/or retained within at least a portion of the second yoke arm king-pin aperture 932 of the second yoke arm 926 of the steering knuckle 804. It is to be understood that the second cap 940 of the second bearing assembly 938 aids in ensuring that the one or more second bushing elements 942, the king-pin 802 and/or the second thrust member 630 are secured within the second yoke arm king-pin aperture 932 of the second yoke arm 926. It is within the scope of this disclosure and as a non-limiting example that the second cap 940 of the second bearing assembly 938 of the king-pin joint assembly 800 may be substantially disc-shaped. Additionally, it is within the scope of this disclosure and as a non-limiting example that the second cap 940 may be retained within the second yoke arm king-pin aperture 932 of the second yoke arm 926 by using one or more welds, one or more mechanical fasteners, one or more adhesives, a threaded connection and/or a press-fit connection. As a non-limiting example, the one or more mechanical fasteners may be one or more snap-rings.

In accordance with the embodiment of the disclosure illustrated in FIG. 7 and as a non-limiting example, at least a portion of the second cap 940 may be received and/or retained within at least a portion of the receiving portion 936 of the second yoke arm king-pin aperture 932. As a result, it is within the scope of this disclosure and as a non-limiting example that the second cap 940 may have an outermost diameter that is substantially similar to an outermost diameter of the increased diameter portion 836 of the second end portion 808 of the king-pin 802.

It is within the scope of this disclosure and as a non-limiting example that the second bearing assembly 938 of the king-pin joint assembly 800 may further include the use of the second thrust member 630. As best seen in FIG. 7 of the disclosure and as a non-limiting example, at least a portion of the second thrust member 630 is interposed between a second end 956 of the king-pin 802 and the inner surface 950 of the second cap 940. The second thrust member 630 of the second bearing assembly 938 aids in reducing the overall amount of friction between the second cap 940 and the second end 956 of the king-pin 802 when in operation thereby improving the overall life and durability of the king-pin joint assembly 800. Additionally, the second thrust member 630 aids in supporting at least a portion of the radial loads experienced by the second bearing assembly 938 when in operation thereby further aiding in improving the overall life and durability of the king-pin joint assembly 800.

In accordance with the embodiment of the disclosure illustrated in FIG. 7 and as a non-limiting example, at least a portion of the second thrust member 630 may be disposed within a second thrust member receiving portion 958 in the inner surface 950 of the second cap 940. The second thrust member receiving portion 958 extends radially outward from at least a portion of the inner surface 950 of the second cap 940. The second thrust member receiving portion 958 of the second cap 940 aids in ensuring that the second thrust member 630 is retained in its ideal operating position between the king-pin 802 and the second cap 940 at all times when in operation. This aids in improving the overall life and durability of the king-pin joint assembly 800.

Disposed radially outboard from the second thrust member receiving portion 958 of the second cap 940 is a lubricant receiving portion 960. As best seen in FIG. 7 of the disclosure and as a non-limiting example, the lubricant receiving portion 960 extends radially outboard from at least a portion of the second thrust member receiving portion 958 of the second cap 940. The lubricant receiving portion 960 of the second cap 940 provides a space for the introduction of an amount of lubricant (not shown) into the second bearing assembly 938 and/or aids in promoting the flow of an amount of lubrication fluid (not shown) within the second bearing assembly 938. This further aids in improving the overall life and durability of the king-pin joint assembly 800.

In accordance with the embodiment of the disclosure illustrated in FIG. 7 and as a non-limiting example, the second bearing assembly 938 of the king-pin joint assembly 800 may further include the use of the second lubrication member 652. The second lubrication member 652 allows for the introduction of an amount of lubrication fluid (not shown) into the second bearing assembly 938 thereby aiding in improving the overall life and durability of the king-pin joint assembly 800. As best seen in FIG. 7 of the disclosure and as a non-limiting example, the second cap 940 has a second cap aperture 962 that extends from the inner surface 950 to the outer surface 952 of the second cap 940. The second cap aperture 962 is of a size and shape to receive and/or retain at least a portion of the second lubrication member 652. As a non-limiting example, the second lubrication member 652 of the second bearing assembly 938 may be retained within the second cap aperture 962 of the second cap 940 by using one or more welds, one or more mechanical fasteners, one or more adhesives, a press-fit connection and/or a threaded connection.

According to a further embodiment of the disclosure and as a non-limiting example, the second cap 940 may further include a radially extending portion 964 that extends radially outboard from at least a portion of the outer surface 952 of the second cap 940. In accordance with this embodiment of the disclosure, the second cap aperture 962 extends through the radially extending portion 964. The radially extending portion 964 of the second cap 940 provides a housing for at least a portion of the second lubrication member 652 of the second bearing assembly 938. As a result, it is to be understood that at least a portion of the second lubrication member 652 is received and/or retained within at least a portion of the second cap aperture 962 in the radially extending portion 964 of the second cap 940.

As best seen in FIG. 7 of the disclosure and as a non-limiting example, the king-pin joint assembly 800 may further include the use of one or more second sealing members 966. At least a portion of the one or more second sealing members 966 are sealingly engaged with at least a portion of the one or more second bushing elements 942, the second end portion 808 of the king-pin 802 and/or the bearing 606. As illustrated in FIG. 7 of the disclosure and as a non-limiting example, at least a portion of the one or more second sealing members 966 of the second bearing assembly 938 are disposed within the second yoke arm king-pin aperture 932 of the second yoke arm 926. Additionally, as illustrated in FIG. 7 of the disclosure and as a non-limiting example, the one or more second sealing members 966 of the second bearing assembly 938 are interposed between the radially inboard end portion 514 of the connector portion 510 and the one or more second bushing elements 942 of the second bearing assembly 938. The one or more second sealing members 966 of the second bearing assembly 938 aid in preventing the migration of dirt, debris and/or moisture into the second bearing assembly 938 thereby aiding in improving the overall life and durability of the king-pin joint assembly 800. Additionally, the one or more second sealing members 966 aid in preventing the migration of an amount of lubrication fluid (not shown) from within the second bearing assembly 938 when in operation thereby further aiding in improving the overall life and durability of the king-pin joint assembly 800.

It is to be understood that the king-pin joint assembly 800 disclosed herein overcomes the disadvantages of the conventional king-pin joint assembles previously described. As a result, the king-pin joint assembly 800 disclosed herein requires little to no maintenance, part replacements and/or repairs over the life of the king-pin joint assembly 800. This aids in reducing the overall costs associated with the maintenance of fleet vehicles and/or the overall costs associated with the ownership of a fleet of vehicles.

Figure 8:
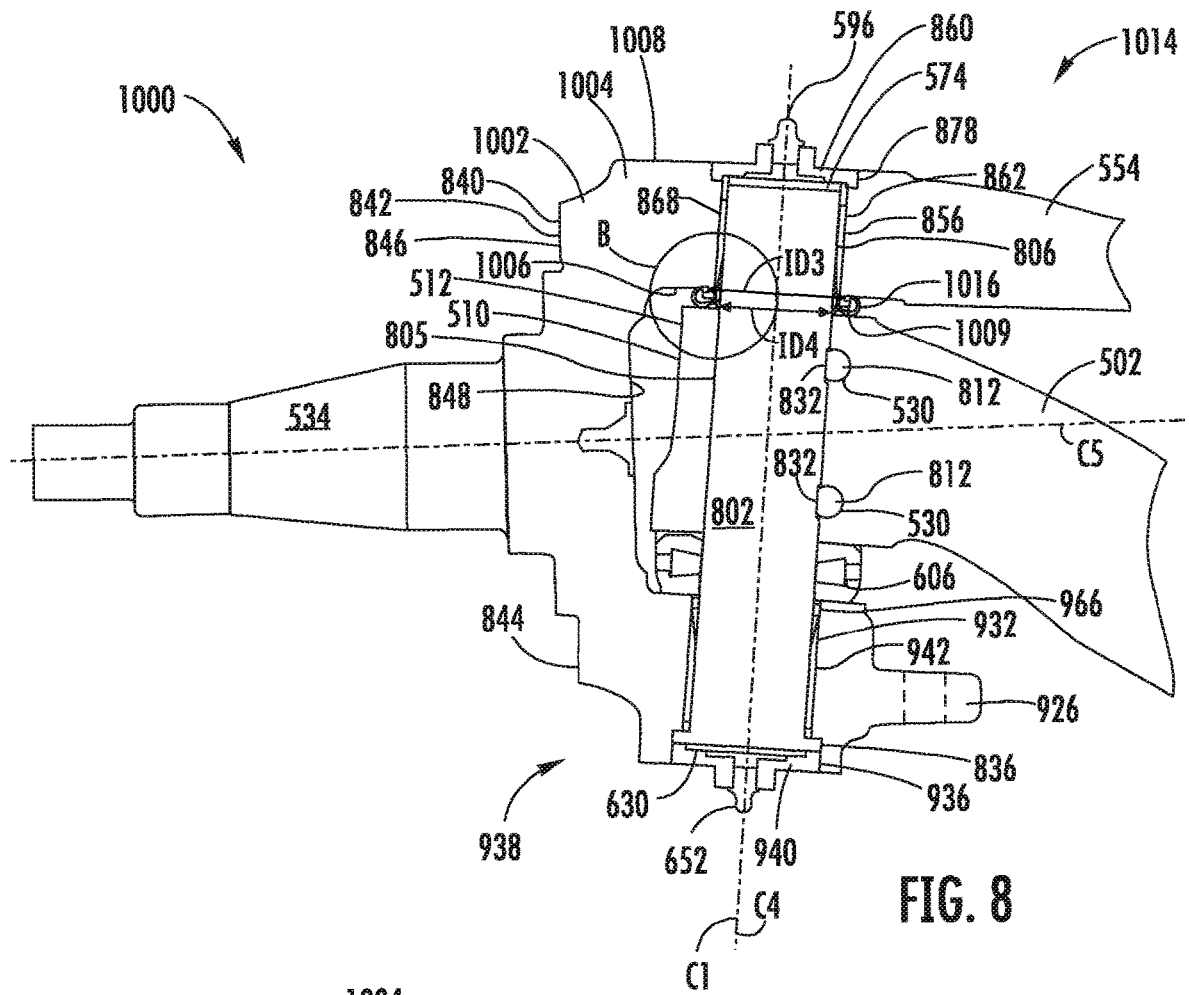
FIG. 8 is a partial cut-away schematic side-view of the king-pin joint assembly illustrated in FIGS. 5-7A according to yet another embodiment of the disclosure.
Figure 8A:
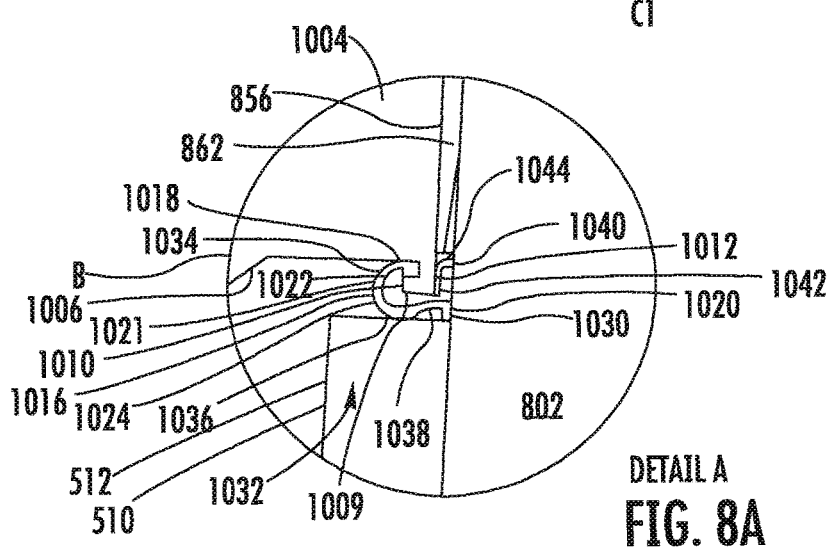
FIG. 8A is a detail view of a portion of the king-pin joint assembly illustrated in FIG. 8 of the disclosure.

FIGS. 8 and 8A provide a schematic side-view of a king-pin joint assembly 1000 according to yet another embodiment of the disclosure. The king-pin joint assembly 1000 illustrated in FIGS. 8 and 8A is the same as the king-pin joint assemblies 500, 700 and 800 illustrated in FIGS. 5-7A, except where specifically noted below. As illustrated in FIGS. 8 and 8A of the disclosure and as a non-limiting example, the king-pin joint assembly 1000 does not include the one or more first sealing members 894 illustrated in FIGS. 7 and 7A.

As best seen in FIG. 8 of the disclosure and as a non-limiting example, a first yoke arm 1004 extends outboard from at least a portion of the axially inboard side 848 of the radially extending portion 840 of the yoke portion 838 of a steering knuckle 1000. The first yoke arm 1004 of steering knuckle 1002 has an inner surface 1006 and an outer surface 1008. Extending radially inward from at least a portion of the inner surface 1006 of the first yoke arm 1004 of the steering knuckle 1002 is a radially inward extending portion 1009 having a first side 1010 a second side 1012. In accordance with the embodiment of the disclosure illustrated in FIGS. 8 and 8A and as a non-limiting example, at least a portion of the first yoke arm king-pin aperture 856 extends through the radially inward extending portion 1009 of the first yoke arm 1004 of the steering knuckle 1002 of the king-pin joint assembly 1000.

Interposed between the radially outboard end portion 512 of the connector portion 510 of the axle beam 502 and the one or more first bushing elements 862 of a first bearing assembly 1014 is one or more first sealing members 1016. As best seen in FIG. 8A of the disclosure and as a non-limiting example, the one or more first sealing members 1016 of the first bearing assembly 1014 has a first end portion 1018, a second end portion 1020, an intermediate portion 1021, an inner surface 1022 and an outer surface 1024. At least a portion of the first end portion 1018 of the one or more first sealing members 1016 are sealingly engaged with at least a portion of the first side 1010 of the radially inward extending portion 1009 of the first yoke arm 1004 of the steering knuckle 1002. Additionally, as best seen in FIG. 8A of the disclosure and as a non-limiting example, at least a portion of the second end portion 1020 of the one or more first sealing members 1016 is sealingly engaged with at least a portion of the outer surface 805 of the first end portion 806 of the king-pin 802 of the king-pin joint assembly 1000. The one or more first sealing members 1016 of the first bearing assembly 1014 aid in preventing the migration of dirt, debris and/or moisture into the first bearing assembly 1014 thereby aiding in improving the overall life and durability of the king-pin joint assembly 1000. Additionally, the one or more first sealing members 1016 aid in preventing the migration of an amount of lubrication fluid (not shown) from within the first bearing assembly 1014 when in operation thereby further aiding in improving the overall life and durability of the king-pin joint assembly 1000.

According to the embodiment of the disclosure illustrated in FIGS. 8 and 8A and as a non-limiting example, the radially inward extending portion 1009 of the first yoke arm 1004 may further include a first sealing member groove 1026. As best seen in FIG. 8A of the disclosure and as a non-limiting example, the first sealing member groove 1026 circumferentially extends along at least a portion of the first side 1010 of the radially inward extending portion 1009 of the first yoke arm 1004 of the steering knuckle 1002. The first sealing member groove 1026 is of a size and shape to receive and/or retain at least a portion of the first end portion 1018 of the one or more first sealing members 1016 of the first bearing assembly 1014. It is to be understood that the first sealing member groove 1026 in the radially inward extending portion 1009 of the first yoke arm 1004 aids in ensuring the one or more first sealing members 1016 are sealingly engaged with at least a portion of the first yoke arm 1004 of the steering knuckle 1002.

In accordance with the embodiment of the disclosure illustrated in FIG. 8 and as a non-limiting example, the first end portion 1018 of the one or more first sealing members 1016 have an inner diameter ID3. Additionally, according to the embodiment of the disclosure illustrated in FIG. 8 and as a non-limiting, the second end portion 1020 of the one or more first sealing members 1016 has an inner diameter ID4. It is within the scope of this disclosure and as a non-limiting example that the inner diameter ID3 of the first end portion 1018 is greater than the inner diameter ID4 of the second end portion 1020 of the one or more first sealing members 1016 of the first bearing assembly 1014.

As illustrated in FIG. 8A of the disclosure and as a non-limiting example, the first end portion 1018 of the one or more first sealing members 1016 has an axially extending portion 1028 and the second end portion 1020 of the one or more first sealing members 1016 has a radially inward extending portion 1030. The intermediate portion 2012 of the one or more first sealing members 1016 has a plurality of arcuate portions 1032. In accordance with the embodiment of the disclosure illustrated in FIG. 8A and as a non-limiting example, the intermediate portion 1021 of the one or more first sealing members 1016 includes a radially inward extending arcuate portion 1034, a first axially inboard extending portion 1036 and a second axially inward extending portion 1038. At least a portion of the axially extending portion 1028 is connected to an end of the radially inward extending arcuate portion 1034 opposite the first axially inboard extending portion 1036 of the one or more first sealing members 1016. Additionally, at least a portion of the radially inward extending portion 1030 is connected to an end of the second axially inward extending portion 1038 opposite the first axially inboard extending portion 1036. As best seen in FIG. 8A and as a non-limiting example, the first axially inward extending portion 1036 is substantially concave in shape and the second axially inward extending portion 1038 is substantially convex in shape. As a result, it is within the scope of this disclosure and as a non-limiting example that the one or more first sealing members 1016 may be substantially S-shaped cross-sectional shape.

It is within the scope of this disclosure and as a non-limiting example that the one or more first sealing members 1016 of the first bearing assembly 1014 may be a purgeable. As a result, it is within the scope of this disclosure and as a non-limiting example that the one or more first sealing members 1016 may be able to vent any excess pressure that is generated within the first bearing assembly 1014 when in operation. Additionally, it is within the scope of this disclosure and as a non-limiting example that the one or more first sealing members 1016 may be able to expel an excess amount of lubrication fluid (not shown) from within the first bearing assembly 1014. This will aid in improving the overall life and durability of the king-pin joint assembly 1000.

Disposed radially outboard from at least a portion of the one or more first sealing members 1016 of the first bearing assembly 1014 is one or more third sealing members 1040. Additionally, at least a portion of the one or more third sealing members 1040 are interposed between the outer surface 806 of the first end portion 806 of the king-pin 802 and the surface 868 defining the first yoke arm king-pin aperture 856 of the first yoke arm 1004. As best seen in FIG. 8A of the disclosure and as a non-limiting example, the one or more third sealing members 1040 includes a radially extending portion 1042 and an axially extending portion 1044. At least a portion of the radially extending portion 1042 is sealingly engaged with at least a portion of the surface 868 defining the first yoke arm king-pin aperture 856 and at least a portion of the axially extending portion 1044 is sealingly engaged with at least a portion of the outer surface 805 of the first end portion 806 of the king-pin 802. The one or more third sealing members 1040 of the first bearing assembly 1014 aid in preventing the migration of dirt, debris and/or moisture into the first bearing assembly 1014 thereby aiding in improving the overall life and durability of the king-pin joint assembly 1000. Additionally, the one or more third sealing members 1040 aid in preventing the migration of an amount of lubrication fluid (not shown) from within the first bearing assembly 1014 when in operation thereby further aiding in improving the overall life and durability of the king-pin joint assembly 1000.

It is to be understood that the king-pin joint assembly 1000 disclosed herein overcomes the disadvantages of the conventional king-pin joint assembles previously described. As a result, the king-pin joint assembly 1000 disclosed herein requires little to no maintenance, part replacements and/or repairs over the life of the king-pin joint assembly 1000. This aids in reducing the overall costs associated with the maintenance of fleet vehicles and/or the overall costs associated with the ownership of a fleet of vehicles.

Figure 9:
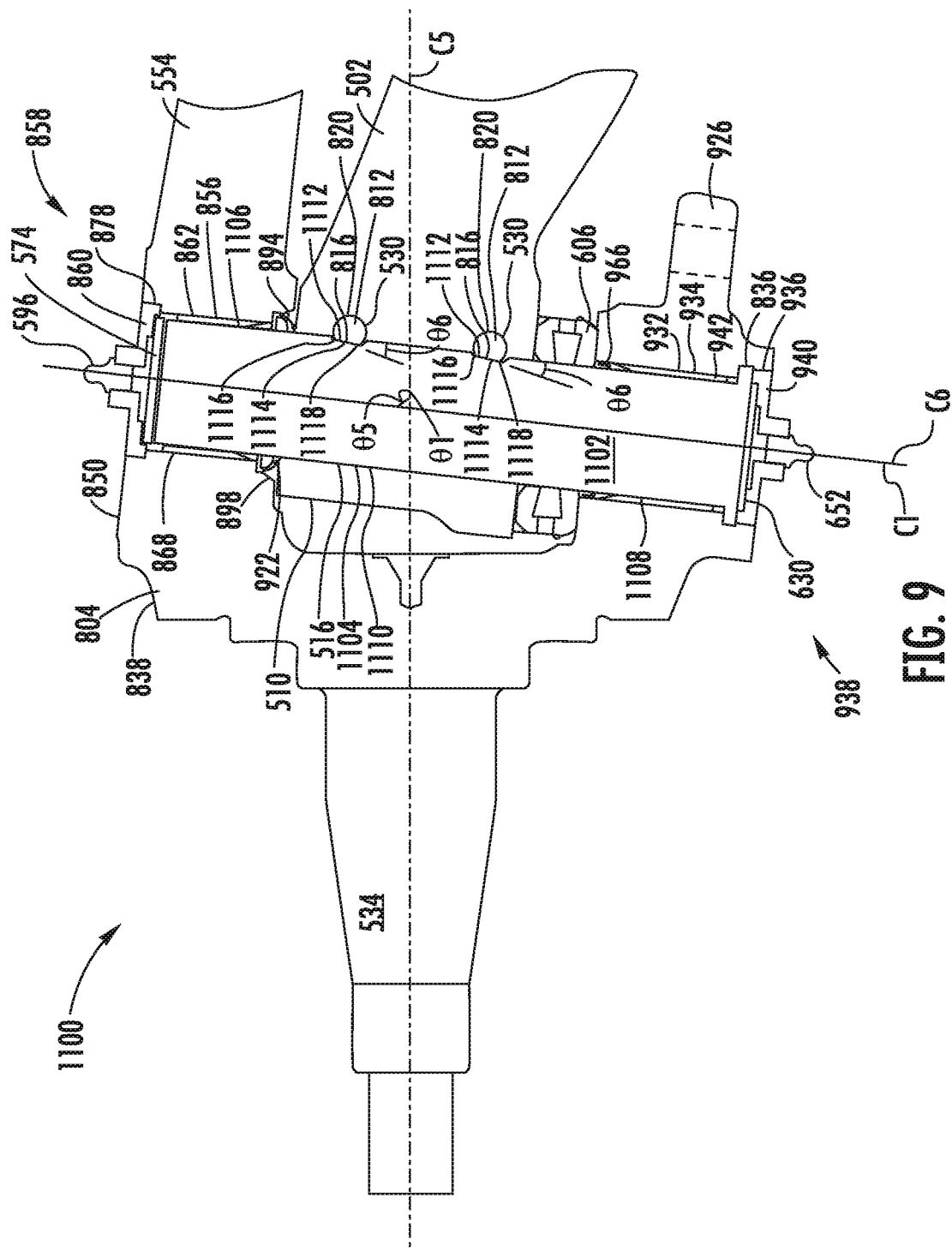
FIG. 9 is a partial cut-away schematic side-view of the king-pin joint assembly illustrated in FIGS. 5-8A according to still yet another embodiment of the disclosure.

FIG. 9 is a partial cut-away schematic side-view of a king-pin joint assembly 1100 according to yet another embodiment of the disclosure. The king-pin joint assembly 1100 illustrated in FIG. 9 is the same as the king-pin joint assemblies 500, 700, 800 and 1000 illustrated in FIGS. 5-8A, except where specifically noted below. As illustrated in FIG. 9 of the disclosure and as a non-limiting example the king-pin joint assembly 1100 includes a king-pin 1102 having an outer surface 1104, a first end portion 1106, a second end portion 1108 and an intermediate portion 1110 interposed between the first and second end portions 1106 and 1108 of the king-pin 1102. At least a portion of the first end portion 1106 of the king-pin 1102 is received and/or retained within at least a portion of the first yoke arm king-pin aperture 856 of the first yoke arm 850 of the king-pin joint assembly 1100. Additionally, at least a portion of the second end portion 1108 of the king-pin 1102 is received and/or retained within at least a portion of the second yoke arm king-pin aperture 932 of the second yoke arm 926 of the king-pin joint assembly 1100.

As illustrated in FIG. 9 of the disclosure and as a non-limiting example, the king-pin 1102 has a center-line C6. When the king-pin joint assembly 1100 is assembled, the king-pin 1102 will have a center-line C6 that is substantially similar to the center-line C1 of the axle beam king-pin receiving aperture 516. As a result, when the king-pin joint assembly 1100 is assembled, the king-pin 1102 will be disposed at an angle θ5 relative to a center-line C5 of the steering knuckle 804. It is within the scope of this disclosure and as a non-limiting example that the angle θ5 of the king-pin 1102 may be substantially equal to the angle θ1 of the axle beam king-pin receiving aperture 516 of the king-pin joint assembly 1100.

In order to retain at least a portion of the king-pin 1102 within the axle beam king-pin receiving aperture 516 of the connector portion 510 of the axle beam 502, at least a portion of the one or more draw keys 812 are received and/or retained within at least a portion of one or more king-pin draw key grooves 1112. As best seen in FIG. 9 of the disclosure and as a non-limiting example, the one or more king-pin draw key grooves 1112 extend along at least a portion of the outer surface 1104 of the intermediate portion 1110 of the king-pin 1102. The one or more king-pin draw key grooves 1112 in the outer surface 1104 of the king-pin 1102 extend substantially transverse to the center-line C6 of the king-pin 1102. Additionally, the one or more king-pin draw key grooves 1112 in the outer surface 1104 of the king-pin 1102 are aligned with the one or more connector portion draw key apertures 530 in the connector portion 510 of the axle beam 502. It is within the scope of this disclosure and as a non-limiting example that the one or more king-pin draw key grooves 1112 have a shape that is complementary to the one or more substantially flat portions 816 of the one or more draw keys 812.

According to the embodiment of the disclosure illustrated in FIG. 9 and as a non-limiting example, the one or more king-pin draw key grooves 1112 have a bottom surface 1114 that is disposed at an angle θ6 relative to the outer surface 1104 of the intermediate portion 1110 of the king-pin 1102. As a result, the one or more king-pin draw key grooves 1112 have a depth that increases from a first end 1116 to a second end 1118 of the bottom surface 1114 of the one or more king-pin draw key grooves 1112. By providing the one or more king-pin draw key grooves 1112 with a bottom surface 1114 extending at the angle θ6 it provides a pre-load force onto at least a portion of the bearing 606 thereby ensuring improved retention of the king-pin 1102 within the axle beam king-pin receiving aperture 516 during rebound. This aids in improving the overall life and durability of the king-pin joint assembly 1100. It is within the scope of this disclosure and as a non-limiting example that the angle θ6 may be from approximately 3 degrees to approximately 15 degrees.

It is to be understood that the king-pin joint assembly 1100 disclosed herein overcomes the disadvantages of the conventional king-pin joint assembles previously described. As a result, the king-pin joint assembly 1100 disclosed herein requires little to no maintenance, part replacements and/or repairs over the life of the king-pin joint assembly 1100. This aids in reducing the overall costs associated with the maintenance of fleet vehicles and/or the overall costs associated with the ownership of a fleet of vehicles.

Figure 10:
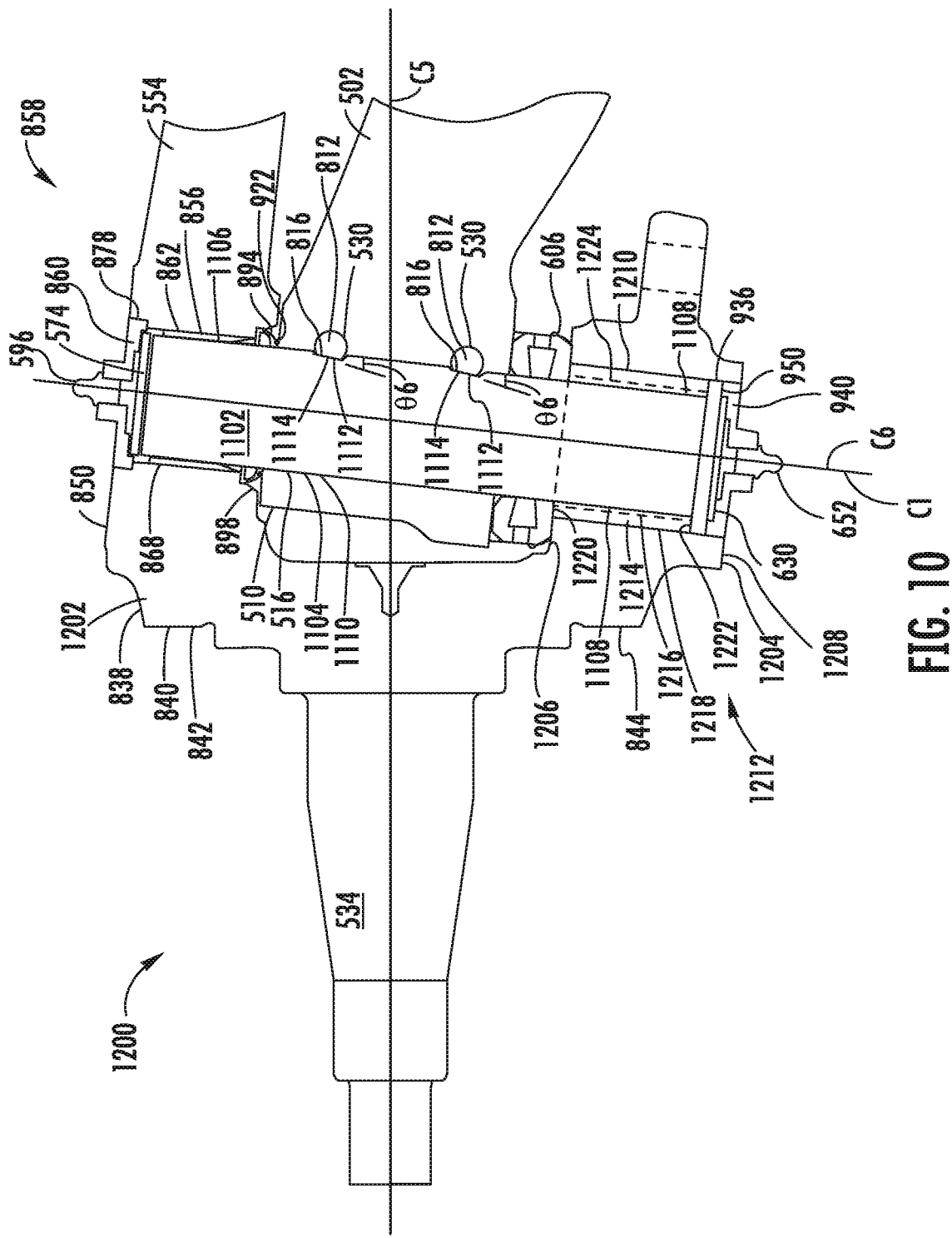
FIG. 10 is a partial cut-away schematic side-view of the king-pin joint assembly illustrated in FIGS. 5-9 according to a further embodiment of the disclosure.

FIG. 10 is a partial cut-away schematic side-view of a king-pin joint assembly 1200 according to a further embodiment of the disclosure. The king-pin joint assembly 1200 illustrated in FIG. 10 is the same as the king-pin joint assemblies 500, 700, 800, 1000 and 1100 illustrated in FIGS. 5-9, except where specifically noted below. As illustrated in FIG. 10 of the disclosure and as a non-limiting example, the king-pin joint assembly 1200 includes a steering knuckle 1202 having a yoke portion 838 with a radially extending portion 840.

Extending outboard from at least a portion of the axially inboard side 848 of the radially inboard end portion 844 of the radially extending portion 840 of the yoke portion 838 of the steering knuckle 1202 is a second yoke arm 1204. As best seen in FIG. 10 of the disclosure and as a non-limiting example, the second yoke arm 1204 of the steering knuckle 804 has an inner surface 1206 and an outer surface 1208. A second yoke arm king-pin aperture 1210 extends from the inner surface 1206 to the outer surface 1208 of the second yoke arm 1204 of the steering knuckle 1202. The second yoke arm king-pin aperture 1210 of the second yoke arm 1202 is of a size and shape to receive and/or retain at least a portion of the second end portion 1108 of the king-pin 1100 of the king-pin joint assembly 1200. It is therefore to be understood that at least a portion of the second end portion 1108 of the king-pin 1102 is disposed within at least a portion of the second yoke arm king-pin aperture 1210 of the second yoke arm 1204. In accordance with an embodiment of the disclosure illustrated in FIG. 10 and as a non-limiting example, the second yoke arm king-pin aperture 1210 of the second yoke arm 1204 may be substantially cylindrical in shape.

Disposed within at least a portion of the second yoke arm king-pin aperture 1210 is a second bearing assembly 1212. As illustrated in FIG. 10 of the disclosure and as a non-limiting example, the second bearing assembly 1212 includes one or more second bushing elements 1214. The one or more second bushing elements 1214 having an inner surface 1216, an outer surface 1218, a first end 1220 and a second end 1222. Extending from the first end 1220 to the second end 1222 of the one or more second bushing elements 1214 is a hollow interior portion 1224. The hollow interior portion 1224 of the one or more second bushing elements 1214 is of a size and shape to receive and/or retain at least a portion of the second end portion 1108 of the king-pin 1102 of the king-pin joint assembly 1200.

As best seen in FIG. 10 of the disclosure and as a non-limiting example, at least a portion of the first end 1220 of the one or more second bushing elements 1214 is in direct contact with at least a portion of an end of the bearing 606 opposite the connector portion 510 of the axle beam 502 of the king-pin joint assembly 1200. Additionally, as illustrated in FIG. 10 of the disclosure and as a non-limiting example, at least a portion of the second end 1222 of the one or more second bushing elements 1214 is in direct contact with at least a portion of the increased diameter portion 836 of the second end portion 1108 of the king-pin 1102 of the king-pin joint assembly 1200.

In accordance with the embodiment of the disclosure illustrated in FIG. 10 and as a non-limiting example, the second yoke arm king-pin aperture 1210 in the second yoke arm 1204 does not include the receiving portion 936. As a result, the one or more second bushing elements 1214 of the second bearing assembly 1212 are retained within the second yoke arm king-pin aperture 1210 of the second yoke arm 1204 by the second cap 940 and the bearing 606 of the king-pin joint assembly 1200. When the king-pin joint assembly 1200 is assembled, at least a portion of the inner surface 950 of the second cap 940 is in direct contact with an end of the increased diameter portion 836 of the king-pin 1102 opposite the one or more second bushing elements 1214. It is therefore to be understood that at least a portion of the one or more second bushing elements 1214 of the second bearing assembly 1212 are supported by at least a portion of the bearing 606 of the king-pin joint assembly 1200.

It is to be understood that the king-pin joint assembly 1200 disclosed herein overcomes the disadvantages of the conventional king-pin joint assembles previously described. As a result, the king-pin joint assembly 1200 disclosed herein requires little to no maintenance, part replacements and/or repairs over the life of the king-pin joint assembly 1200. This aids in reducing the overall costs associated with the maintenance of fleet vehicles and/or the overall costs associated with the ownership of a fleet of vehicles.

Figure 11:
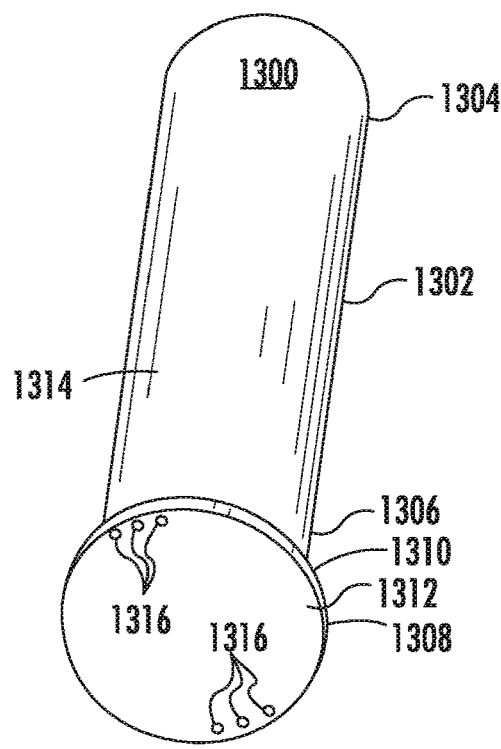
FIG. 11 is a schematic perspective view of the king-pin illustrated in FIGS. 5-10 according to an alternative embodiment of the disclosure.

FIG. 11 is a schematic perspective view of a king-pin 1300 according to an alternative embodiment of the disclosure. The king-pin 1300 illustrated in FIG. 11 is the same as the king-pins 506, 802 and 1102 illustrated in FIGS. 5-10, except where specifically noted below. It is within the scope of this disclosure and as a non-limiting example that the king-pin 1300 illustrated in FIG. 11 may be used in place of the king-pins 506, 802 and 1102 within the king-pin joint assemblies 500, 700, 800, 1000, 1100 and/or 1200 illustrated in FIGS. 5-10.

As illustrated in FIG. 11 of the disclosure and as a non-limiting example, the king-pin 1300 has an outer surface 1302, a first end portion, 1304 and a second end portion 1306. Circumferentially extending from at least a portion of the outer surface 1302 of the second end portion 1306 of the king-pin 1300 is an increased diameter portion 1308 having a first end 1310 and a second end 1312. Extending from the first end 1310 to the second end 1312 of the increased diameter portion 1308 of the king-pin 1300, at a point outboard from a body portion 1314 of the king-pin 1300, is one or more king-pin apertures 1316. The one or more king-pin apertures 1316 of the king-pin 1300 allow for the flow of an amount of lubrication fluid (not shown) within the second bearing assemblies 614, 724, 938 and/or 1212 of the king-pin joint assemblies 500, 700, 800, 1000, 1100 and/or 1200 illustrated in FIGS. 5-10. As a result, the one or more king-pin apertures 1316 of the king-pin 1300 place the second lubrication member 652 in fluid communication with the one or more second bushings 942 and/or 1214 and/or the one or more second rolling elements 620 within the second bearing assemblies 614, 724, 938 and/or 1212 of the king-pin joint assemblies 500, 700, 800, 1000, 1100 and/or 1200. It is to be understood that the one or more king-pin apertures 1316 aid in facilitating the movement of an amount of lubrication fluid (not shown) within the second bearing assemblies 614, 724, 938 and/or 1212 which improves the overall life and durability of the king-pin joint assemblies 500, 700, 800, 1000, 1100 and/or 1200.

As a result, it is to be understood that the king-pin 1300 aids in ensuring the king-pin joint assemblies 500, 700, 800, 1000, 1100 and/or 1200 overcome the disadvantages of the conventional king-pin joint assembles previously described. It is therefore to be understood that the king-pin 1300 aids in ensuring that the king-pin joint assemblies 500, 700, 800, 1000, 1100 and/or 1200 require little to no maintenance, part replacements and/or repairs over the life of the king-pin joint assemblies 500, 700, 800, 1000, 1100 and/or 1200. This aids in reducing the overall costs associated with the maintenance of fleet vehicles and/or the overall costs associated with the ownership of a fleet of vehicles.

Figure 12:
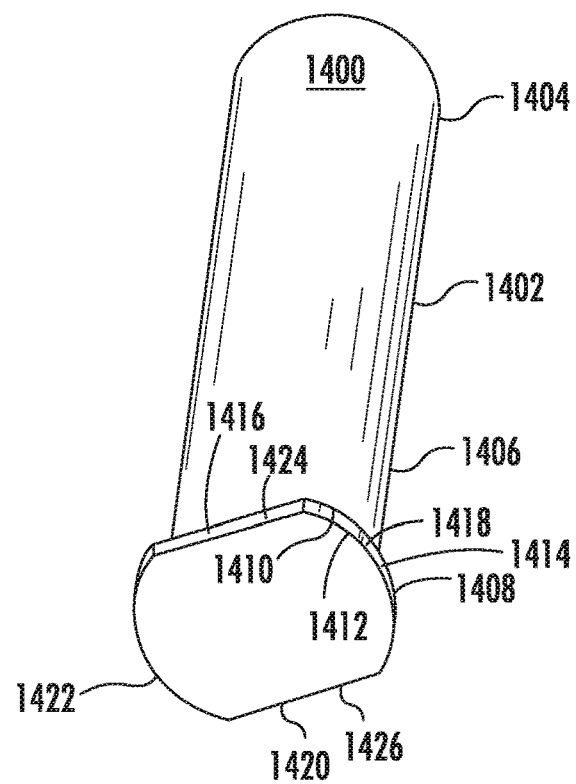
FIG. 12 is a schematic perspective view of the king-pin illustrated in FIGS. 5-11 according to another embodiment of the disclosure.

FIG. 11 is a schematic perspective view of a king-pin 1400 according to another embodiment of the disclosure. The king-pin 1400 illustrated in FIG. 12 is the same as the king-pins 506, 802, 1102 and 1300 illustrated in FIGS. 5-11, except where specifically noted below. It is within the scope of this disclosure and as a non-limiting example that the king-pin 1400 illustrated in FIG. 12 may be used in place of the king-pins 506, 802, 1102 and 1300 within the king-pin joint assemblies 500, 700, 800, 1000, 1100 and/or 1200 illustrated in FIGS. 5-10.

As illustrated in FIG. 11 of the disclosure and as a non-limiting example, the king-pin 1400 has an outer surface 1402, a first end portion, 1404 and a second end portion 1406. Circumferentially extending from at least a portion of the outer surface 1402 of the second end portion 1406 of the king-pin 1400 is an increased diameter portion 1408 having a first end 1410 and a second end 1412. In accordance with the embodiment of the disclosure illustrated in FIG. 12 and as a non-limiting example, an outer periphery 1414 of the increased diameter portion 1208 of the king-pin 1400 includes a first substantially straight portion 1416, a first substantially arcuate portion 1418, a second substantially straight portion 1420 and a second substantially arcuate portion 1442. As illustrated in FIG. 12 of the disclosure and as a non-limiting example at least a portion of the first substantially arcuate portion 1418 of the increased diameter portion 1408 of the king-pin 1400 is connected to an end of the first and second substantially straight portions 1416 and 1420 opposite the second arcuate portion 1422. It is within the scope of this disclosure and as a non-limiting example that the first substantially straight portion 1416 of the outer periphery 1414 of the increased diameter portion 1408 may be substantially parallel to the second substantially straight portion 1420 of the outer periphery 1414 of the increased diameter portion 1408 of the king-pin 1400.

It is to be understood that the first substantially straight portion 1416 of the increased diameter portion 1408 of the king-pin 1400 defines a first truncated portion 1424 that extends from the first end 1410 to the second end 1412 of the increased diameter portion 1408. Additionally, it is to be understood that the second substantially straight portion 1420 of the increased diameter portion 1408 of the king-pin 1400 defines a second truncated portion 1426 that extends from the first end 1410 to the second end 1412 of the increased diameter portion 1408. As a result, the first and second substantially flat portions 1416 and 1420 and therefore the first and second truncated portions 1424 and 1426 bilaterally truncate the increased diameter portion 1408 of the king-pin 1400.

The first and second substantially flat portions 1416 and 1420 and therefore the first and second truncated portions 1424 and 1426 of the increased diameter portion 1408 of the king-pin 1400, allow for the flow of an amount of lubrication fluid (not shown) within the second bearing assemblies 614, 724, 938 and/or 1212 of the king-pin joint assemblies 500, 700, 800, 1000, 1100 and/or 1200 illustrated in FIGS. 5-10. As a result, the first and second substantially flat portions 1416 and 1420 and therefore the first and second truncated portions 1424 and 1426 place the second lubrication member 652 in fluid communication with the one or more second bushings 942 and/or 1214 and/or the one or more second rolling elements 620 within the second bearing assemblies 614, 724, 938 and/or 1212 of the king-pin joint assemblies 500, 700, 800, 1000, 1100 and/or 1200. It is therefore to be understood that the first and second substantially flat portions 1416 and 1420 and therefore the first and second truncated portions 1424 and 1426 aid in facilitating the movement of an amount of lubrication fluid (not shown) within the second bearing assemblies 614, 724, 938 and/or 1212 which improves the overall life and durability of the king-pin joint assemblies 500, 700, 800, 1000, 1100 and/or 1200.

As a result, it is to be understood that the king-pin 1400 aids in ensuring the king-pin joint assemblies 500, 700, 800, 1000, 1100 and/or 1200 overcome the disadvantages of the conventional king-pin joint assembles previously described. It is therefore to be understood that the king-pin 1400 aids in ensuring that the king-pin joint assemblies 500, 700, 800, 1000, 1100 and/or 1200 require little to no maintenance, part replacements and/or repairs over the life of the king-pin joint assemblies 500, 700, 800, 1000, 1100 and/or 1200. This aids in reducing the overall costs associated with the maintenance of fleet vehicles and/or the overall costs associated with the ownership of a fleet of vehicles.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present invention has been described to represent what is considered to represent the preferred embodiments. However, it should be note that this invention can be practiced in other ways than those specifically illustrated and described without departing from the spirit or scope of this invention.

What is claimed is:

1. A king-pin joint assembly, comprising:
   a king-pin having an outer surface;
   an axle beam having a connector portion with a radially outboard end portion and a radially inboard end portion;
      wherein an axle beam king-pin receiving aperture extends from said radially outboard end portion to said radially inboard end portion of said connector portion;
      wherein at least a portion of an intermediate portion of said king-pin is received and/or retained within at least a portion of said axle beam king-pin receiving aperture;
   a steering knuckle having a yoke portion;
      wherein said yoke portion has a first yoke arm and a second yoke arm;
      wherein a first yoke arm king-pin aperture having a first end portion and a second end portion extends from an inner surface to an outer surface of said first yoke arm;
      wherein at least a portion of a first end portion of said king-pin and at least a portion of said radially outboard end portion of said connector are received and/or retained within at least a portion of said first yoke arm king-pin aperture;
      wherein a second yoke arm king-pin aperture extends from an inner surface to an outer surface of said second yoke arm;
      wherein at least a portion of a second end portion of said king-pin is received and/or retained within at least a portion of said second yoke arm king-pin aperture;
   a first bearing assembly comprising a first bearing cup and one or more first rolling elements that are received and/or retained within at least a portion of said first yoke arm king-pin aperture;
      wherein at least a portion of a first end of said first bearing cup of said first bearing assembly is in direct contact with at least a portion of said radially outboard end portion of said connector portion of said axle beam;
   a second bearing assembly that is received and/or retained within at least a portion of said second yoke arm king-pin aperture.

2. The king-pin joint assembly of claim 1, wherein said first bearing cup has an outer surface, said first end, a second end and a body portion;
   wherein a hollow interior portion extends inward from at least a portion of said first end of said first bearing cup;
   wherein at least a portion of said first end portion of said king-pin and said one or more first rolling elements are received and/or retained within at least a portion of said hollow interior portion of said first bearing cup;
   wherein one or more first retaining members are received and/or retained within at least a portion of one or more first yoke arm retaining member grooves circumferentially extending along at least a portion of a surface defining said first yoke arm king-pin aperture and at least a portion of one or more first cap retaining member grooves circumferentially extending along at least a portion of said outer surface of said body portion of said first bearing cup;
   wherein said second bearing assembly comprises a second bearing cup and one or more second rolling elements;
   wherein said second bearing cup has an outer surface, a first end, a second end and a body portion;
   wherein a hollow interior portion extends inward from at least a portion of said first end of said second bearing cup;
   wherein at least a portion of said first end portion of said king-pin and said one or more first rolling elements are received and/or retained within at least a portion of said hollow interior portion of said first bearing cup; and
   wherein one or more second retaining members are received and/or retained within at least a portion of one or more second yoke arm retaining member grooves circumferentially extending along at least a portion of a surface defining said second yoke arm king-pin aperture and at least a portion of one or more second cap retaining member grooves circumferentially extending along at least a portion of said outer surface of said body portion of said second bearing cup.

3. The king-pin joint assembly of claim 2, further comprising a first lubrication member and a second lubrication member;
   wherein at least a portion of said first lubrication member is received and/or retained within at least a portion of a first bearing cup aperture within a base portion of said first bearing cup; and
   wherein at least a portion of said second lubrication member is received and/or retained within at least a portion of a second bearing cup aperture within a base portion of said second bearing cup.

4. The king-pin joint assembly of claim 1, wherein said first cap has an inner surface, an outer surface and a body portion;
   wherein at least a portion of said first cap is disposed radially outboard from at least a portion of said first bearing cup of said first bearing assembly;

wherein one or more first retaining members are received and/or retained within at least a portion of one or more first yoke arm retaining member grooves circumferentially extending along at least a portion of a surface defining said first yoke arm king-pin aperture and at least a portion of one or more first cap retaining member grooves circumferentially extending along at least a portion of said body portion of said first cap;

wherein said second bearing assembly comprises a second cap, second bearing cup and one or more second rolling elements;

wherein said second cap has an inner surface, an outer surface and a body portion;

wherein at least a portion of said second cap is disposed radially outboard from at least a portion of said second bearing cup of said second bearing assembly; and wherein one or more second retaining members are received and/or retained within at least a portion of one or more second yoke arm retaining member grooves circumferentially extending along at least a portion of a surface defining said second yoke arm king-pin aperture and at least a portion of one or more second cap retaining member grooves circumferentially extending along at least a portion of said body portion of said second cap.

5. The king-pin joint assembly of claim 4, further comprising a first lubrication member and a second lubrication member;

wherein at least a portion of said first lubrication member is received and/or retained within at least a portion of a first cap aperture extending from said inner surface to said outer surface of said first cap; and wherein at least a portion of said second lubrication member is received and/or retained within at least a portion of a second cap aperture extending from said inner surface to said outer surface of second first cap.

6. The king-pin joint assembly of claim 1, wherein said king-pin further comprises an increased diameter portion circumferentially extending from at least a portion of said second end portion of said king-pin; and wherein said increased diameter portion of said second end portion of said king-pin prevents said king-pin from working its way out of said king-pin joint assembly when in operation.

7. The king-pin joint assembly of claim 6, wherein at least a portion of said increased diameter portion of said second end portion of said king-pin is received and/or retained within at least a portion of a receiving portion circumferentially extending along at least a portion of a first end portion of a surface defining said second yoke arm king-pin aperture.

8. The king-pin joint assembly of claim 6, wherein said increased diameter portion of said second end portion of said king-pin has one or more king-pin apertures extending from a first end to a second end of said increased diameter portion of said king-pin; and wherein said one or more king-pin apertures are of a size and shape to allow an amount of lubrication fluid to flow therethrough.

9. The king-pin joint assembly of claim 6, wherein said increased diameter portion of said second end portion of said king-pin has a first truncated portion and a second truncated portion that bilaterally truncate said increased diameter portion of said king-pin.

10. The king-pin joint assembly of claim 6, wherein said second bearing assembly comprises one or more bushing elements having an inner surface, an outer surface, a first end and a second end;

wherein a hollow interior portion extends from at least a portion of said first end to said second end of said one or more bushing elements;

wherein at least a portion of said second end portion of said king-pin is received and/or retained within at least a portion of said hollow interior portion of said one or more bushings of said second bearing assembly;

wherein at least a portion of said first end of said one or more bushings are in direct contact with at least a portion of a bearing interposed between said inner surface of said second yoke arm and said radially inboard end portion of said connector portion of said axle beam; and wherein at least a portion of said second end of said one or more bushings are in direct contact with at least a portion of said increased diameter portion of said king-pin.

11. The king-pin joint assembly of claim 1, further comprising one or more draw keys having an outer surface and a body portion;

wherein said one or more draw keys are substantially cylindrical in shape;

wherein one or more substantially flat portions extend along at least a portion of said outer surface of said body portion of said one or more draw keys;

wherein at least a portion of said an arcuate portion of said body portion of said one or more draw keys is received and/or retained within at least a portion of one or more connector portion draw key apertures in said connector portion of said axle beam;

wherein at least a portion of said one or more substantially flat portions of said one or more draw keys are received and/or retained within at least a portion of one or more king-pin draw key grooves that are aligned with said one or more connector portion draw key apertures; and wherein a bottom surface of said one or more king-pin draw key grooves and said one or more substantially flat portions of said one or more draw keys are disposed at an angle $\theta 6$ relative to said outer surface of said intermediate portion of said king-pin.

12. A king-pin joint assembly, comprising:
a king-pin having an outer surface, a first end portion and a second and portion;
  wherein said second end portion of said king-pin has an increased diameter portion;
an axle beam having a connector portion engaged with said king-pin;
a steering knuckle having a yoke portion;
  wherein said yoke portion has a first yoke arm and a second yoke arm;
  wherein at least a portion of a first end portion of said king-pin is received and/or retained within at least a portion of a first yoke arm king-pin aperture in said first yoke arm;
  wherein at least a portion of a second end portion of said king-pin is received and/or retained within at least a portion of a second yoke arm king-pin aperture in said second yoke arm;
  wherein at least a portion of said increased diameter portion of said second end portion of said king-pin is received and/or retained within at least a portion of a receiving portion circumferentially extending along at least a portion of a first end portion of a surface defining said second yoke arm king-pin aperture in said second yoke arm; and wherein said increased diameter portion of said king-pin has one or more king-pin apertures therein having a size and shape to allow an amount of lubrication fluid to flow therethrough.

13. The king-pin joint assembly of claim 12, wherein said receiving portion in said second yoke arm king-pin aperture has a diameter that is greater than a diameter of said second yoke arm king-pin aperture in said second yoke arm; and/or wherein said increased diameter portion of said second end portion of said king-pin has a first truncated portion and/or a second truncated portion that bilaterally truncate said increased diameter portion of said king-pin.

14. The king-pin joint assembly of claim 12, further comprising:

a first bearing assembly that is received and/or retained within at least a portion of said first yoke arm king-pin aperture;

one or more first sealing members;

wherein said one or more first sealing members are sealingly engaged with at least a portion of said outer surface of said king-pin and at least a portion of said first yoke arm; and wherein said one or more first sealing members vent an amount of excess pressure from within said first bearing assembly and/or wherein said one or more first sealing members expel an excess amount of lubrication fluid from within said first bearing assembly.

15. The king-pin joint assembly of claim 14, wherein said one or more first sealing members have an inner surface, an outer surface, a first end portion, a second end portion and an intermediate portion interposed between said first and second end portions of said one or more first sealing members;

wherein said first end portion of said one or more first sealing members has a first radially extending portion;

wherein at least a portion of said first radially extending portion of said one or more first sealing members is disposed within and sealingly engaged with at least a portion of a sealing member receiving portion circumferentially extending along at least a portion of a surface defining said first yoke arm king-pin aperture;

wherein said second end portion of said one or more first sealing members has a second radially extending portion;

wherein at least a portion of said second radially extending portion of said one or more first sealing members is sealingly engaged with at least a portion of said outer surface of said first end portion of said king-pin; and wherein said intermediate portion of said one or more first sealing members has an arcuate portion.

16. The king-pin joint assembly of claim 15, wherein said arcuate portion of said one or more first sealing members is substantially concave in shape.

17. The king-pin joint assembly of claim 15, wherein said first radially extending portion of said one or more first sealing members has an inner diameter ID1 that is larger than an inner diameter ID2 of said second radially extending portion of said one or more first sealing members.

18. The king-pin joint assembly of claim 15, further comprising a seal retaining member, and wherein at least a portion of said seal retaining member is received and/or retained within at least a portion of a seal retaining member groove circumferentially extending along at least a portion said outer surface of said second radially extending portion of said one or more first sealing members.

19. The king-pin joint assembly of claim 14, wherein said one or more first sealing members have an inner surface, an outer surface, a first end portion, a second end portion and an intermediate portion interposed between said first and second end portions of said one or more first sealing members;

wherein said first end portion of said one or more first sealing members has an axially extending portion;

wherein at least a portion of said axially extending portion of said first end portion of said one or more first sealing members is received and/or retained within at least a portion of a first sealing member groove circumferentially extending along at least a portion of a first side of a radially inward extending portion extending radially inward from said inner surface of said first yoke arm;

wherein said second end portion of said one or more first sealing members has a radially inward extending portion;

wherein at least a portion of said radially inward extending portion of said second end portion of said one or more first sealing members is sealingly engaged with at least a portion of said outer surface of said first end portion of said king-pin; and wherein said intermediate portion of said one or more first sealing members comprises a radially inward extending arcuate portion, a first axially inboard extending portion and a second axially inward extending portion.

20. The king-pin joint assembly of claim 19, wherein said one or more first sealing members is substantially S-shaped.

* * * * *